United States Patent
Abraham

(10) Patent No.: US 6,407,987 B1
(45) Date of Patent: *Jun. 18, 2002

(54) TRANSFORMER COUPLER FOR COMMUNICATION OVER VARIOUS LINES

(75) Inventor: Charles Abraham, Wayne, PA (US)

(73) Assignee: Wire21, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/344,258

(22) Filed: Jun. 25, 1999

Related U.S. Application Data

(63) Continuation of application No. 08/818,817, filed on Mar. 14, 1997, which is a continuation-in-part of application No. 08/458,229, filed on Jun. 20, 1995, now Pat. No. 5,717,685, which is a continuation of application No. 07/822,329, filed on Jan. 17, 1992, now abandoned, and a continuation of application No. 07/515,578, filed on Apr. 26, 1990, now abandoned, which is a continuation-in-part of application No. 07/429,208, filed on Oct. 30, 1989, now abandoned, which is a continuation-in-part of application No. 07/344,907, filed on Apr. 28, 1989, now abandoned.

(51) Int. Cl.[7] ............................................. H04M 11/04
(52) U.S. Cl. ............ 370/295; 340/310.01; 340/310.07; 340/531; 370/282; 370/463
(58) Field of Search .................. 370/281, 282, 370/295, 485, 463, 401; 379/206; 340/310.01, 310.02, 310.03, 310.06, 310.07, 531, 310.05

(56) References Cited

U.S. PATENT DOCUMENTS

| | | | |
|---|---|---|---|
| 3,911,415 A | * 10/1975 | Whyte | 340/310.07 |
| 3,962,547 A | * 6/1976 | Pattantyus-Abraham | 340/310.07 |
| 4,066,912 A | 1/1978 | Wetherell | 307/3 |
| 4,148,019 A | * 4/1979 | Durkee | 340/531 |
| 4,323,882 A | 4/1982 | Gajjar | 340/310 R |
| 4,471,399 A | * 9/1984 | Udren | 361/64 |
| 4,514,594 A | * 4/1985 | Brown et al. | 340/310.01 |
| 4,549,178 A | 10/1985 | Lester | 340/825.58 |
| 4,567,511 A | 1/1986 | Smith et al. | 358/84 |
| 4,715,045 A | * 12/1987 | Lewis et al. | 375/58 |
| 4,723,115 A | 2/1988 | Apter | 333/181 |
| 4,912,553 A | * 3/1990 | Pal et al. | 358/86 |
| 5,066,939 A | 11/1991 | Mansfield, Jr. | 340/310 R |
| 5,136,455 A | 8/1992 | Billingsley | 361/56 |
| 5,327,316 A | 7/1994 | Yi | 361/56 |
| 5,424,587 A | 6/1995 | Federowicz | 307/140 |
| 5,559,377 A | * 9/1996 | Abraham | 340/310.07 |
| 5,717,685 A | * 2/1998 | Abraham | 340/310.01 |

\* cited by examiner

Primary Examiner—Douglas Olms
Assistant Examiner—Shick Hom
(74) Attorney, Agent, or Firm—Akin, Gump, Strauss, Hauer & Feld, L.L.P.

(57) ABSTRACT

An apparatus for electrical line communication includes a transmitter, a receiver, a modem, and a coupler at each of two or more locations along an electrical line. The couplers have capacitive circuits serially connected with an air-core transformer. The capacitive circuits resonate with the air-core transformer at a preselected frequency. A novel phase linear coupler eliminates noise and is matched resistively to the characteristic impedance of the line at the preselected frequency, which linearizes communication on the line and allows high speed data and voice communication over long distances.

23 Claims, 36 Drawing Sheets

PRIOR ART

PRIOR ART

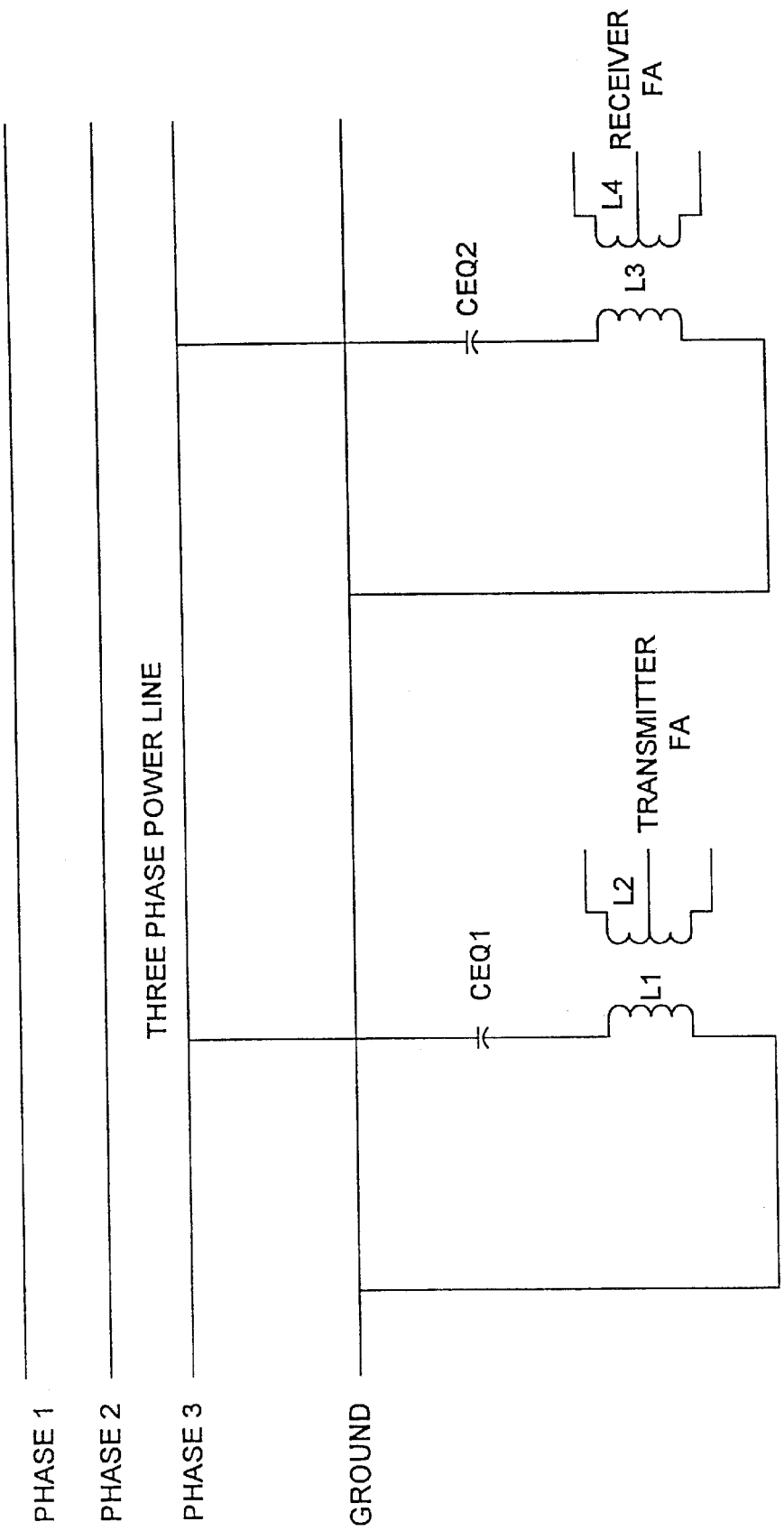

TRANSFORMER COUPLER FOR COMMUNICATION OVER VARIOUS LINES

CROSS REFERENCE TO RELATED APPLICATION

This application is a continuation of U.S. patent application Ser. No. 08/818,817, filed Mar. 14, 1997, which is a continuation in part of U.S. patent application Ser. No. 08/458,229, filed Jun. 20, 1995, which is a continuation of U.S. patent application Ser. No. 07/822,329, filed Jan. 17, 1992 (now abandoned), which is a continuation of U.S. patent application Ser. No. 07/515,578, filed Apr. 26, 1990 (now abandoned), which is a continuation in part of U.S. patent application Ser. No. 07/429,208, filed Oct. 30, 1989 (now abandoned), which is a continuation in part of U.S. patent application Ser. No. 07/344,907, filed Apr. 28, 1989 (now abandoned), the entire disclosure of which is incorporated herein by reference.

BACKGROUND OF THE INVENTION

The present invention relates generally to power system communications, and more particularly to apparatus capable of simultaneously transmitting and receiving digital data signals both at high rates and over long distances through power lines and power line transformers, including AC, DC, coaxial cables, and twisted pair lines.

"Power-line Carriers" are well known in the field-of power system communications. The principal elements of such power-line carriers are transmitting and receiving terminals, which include one or more line traps, one or more coupling capacitors, and tuning and coupling equipment. Detailed information regarding the description and typical composition of conventional power-line carriers may be found in *Fundamentals Handbook of Electrical and Computer Engineering Volume II: Communication Control Devices and Systems*, John Wiley & Sons, 1983, pp 617–627, the contents of which are incorporated herein by reference. A significant problem associated with prior art power-line carriers is their requirement for one or more line traps, one or more capacitors, one or more coupling transformers or carrier frequency hybrid circuits and frequency connection cables.

All traditional couplers incorporate a ferrite or iron core transformer which causes signal distortion due to the non-linear phase characteristic of the transfer function between the transmit coupler and the receive coupler. The distortion is created by the presence of magnetic core material which exhibits hysteresis. For distribution power-line carriers, the distortion -is particularly severe because the signal must propagate through at least three such non-linear devices, the distribution transformer and two power-line couplers, that use ferrite core transformers. The distortion caused by these non-linear devices leads to envelope delay distortion, which limits communication speeds.

A line with a characteristic impedance Zo is ideally matched by terminations equal to Zo at both ends. Since Zo is primarily resistive at the frequencies of interest, the input impedance of the couplers should also be primarily resistive and equal to Zo at the carrier frequencies. A general configuration to achieve this is shown in FIG. 4. FIG. 4 is a schematic diagram of a phase shift linear coupler of the present invention. The coupler uses a serially connected equivalent capacitor, Ceq, on the primary of a transformer. The design is based on two principles. First, the resonance between the coupling capacitor, Ceq, and the primary winding inductance, L1, provides a low resistive impedance at the desired transmit carrier frequency. Second, Ceq has a large enough impedance at 60 Hz to block the line frequency. Although this basic approach is not new, previous efforts at achieving satisfactory impedance matching encountered problems, as discussed below.

The major shortcoming of previous designs resulted from the use of ferrite or-iron core transformers in the signal couplers. The inductance, L1, is altered to some unknown value due to the non-linearity of the core. This results in a mistuning of the desired carrier frequency. Also, the impedance of the primary winding at the desired carrier frequency is no longer purely resistive. This may lead to a mismatch with respect to the line characteristic impedance. In recognition of this fact, other designs (FIGS. 1, 2) attempt to merely couple a signal onto a power line with a low transceiver input impedance by using a large coupling capacitor (approx. 0.5 uF). This results in a significant coupling loss of up to 20 dB at the carrier frequency. FIG. 3 is a graphical illustration of the frequency response characteristics of a traditional coupler which uses a magnetic-core transformer.

In view of the above, it is an object of the present invention to provide a power line communications apparatus which utilizes a novel phase shift linear power, phone, twisted pair, and coaxial line coupler for both transmission and reception. It is a further object of the present invention to provide power-line communication apparatus utilizing novel air-core transformers which can be used for phone line, coaxial, LAN and power line communication through power line transformers. It is an additional object of the present invention to provide a power line communication apparatus in which the primary coil of the transformer resonates with an associated coupling capacitor network in order to achieve resistive matching to approximately the lowest known value of the line characteristic impedance and to maximize stable signal transmission onto the line. This resonance effectively creates a band pass filter at carrier frequency.

BRIEF SUMMARY OF THE INVENTION

Briefly stated, in a first embodiment, the present invention is a communications apparatus for communicating electrical signals through an electrical line having a characteristic impedance. The communications apparatus comprises:

modulator means for modulating the electrical signals to produce a modulated carrier signal having a first preselected frequency;

transmitter means having an output impedance, electrically connected to said modulator means for transmitting the modulated carrier signal; and first coupler means connected between the electrical line and the transmitter means for matching the output impedance of said transmitter means to the characteristic impedance of the electrical line, wherein the first preselected frequency is less than 90 Khz and has a linear phase bandwidth of approximately 7 Khz.

In a second embodiment, the present invention is a communications apparatus for communicating electrical signals through an electrical line having a characteristic impedance. The apparatus comprises:

modulator means for modulating the electrical signals to produce a modulated carrier signal having a first preselected frequency;

transmitter means having an output impedance, electrically connected to said modulator means for transmitting the modulated carrier signal;

first coupler means connected between the electrical line and the transmitter means for matching the output impedance of said transmitter means to the characteristic impedance of the electrical line, said first coupler means comprising linear phase means for communicating the modulated carrier signal to the electrical line without significant phase distortion and capacitor means for resonating with the linear phase means at the first preselected frequency;

receiver means having an input impedance for receiving the modulated carrier signal;

demodulator means electrically connected to said receiver means for demodulating said modulated carrier signal to produce a demodulated carrier signal having-a second preselected frequency; and second coupler means connected between the electrical line and the receiver means for matching the input impedance-of said receiver means to the characteristic impedance of the electrical line, said second coupler means comprising linear phase means for communicating the modulated carrier signal to the receiver means without significant phase distortion and capacitor means for resonating with the linear phase means at the second preselected frequency.

In a third embodiment, the present invention is a communication apparatus for communicating electrical signals through a pair of electrical lines having a characteristic impedance. The apparatus comprises:

first modem means for producing a modulated carrier signal having a first preselected frequency and demodulating a modulated carrier signal having a second preselected frequency;

first transmitter means having an output impedance, connected to the first modem means for transmitting the modulated carrier signal at the first preselected frequency;

first receiver means having an input impedance, connected to the first modem means for receiving the modulated carrier signal having the second preselected frequency;

first coupler means connected between the pair of electrical lines and said first transmitter and receiver means for matching the impedance of said means to the characteristic impedance of the pair of electrical lines and for communicating the carrier signals without substantial phase distortion;

second modem means for producing a modulated carrier signal having the second preselected frequency and demodulating a modulated carrier signal having the first preselected frequency;

second transmitter means having an output impedance, connected to the second modem means, for transmitting the modulated carrier signal at the second preselected frequency;

second receiver means having an input impedance connected to the second modem means, for receiving the modulated carrier signal having the first preselected frequency; and second coupler means connected between the electrical lines and said second transmitter and receiver means for matching the impedance of said devices to the characteristic impedance of the electrical lines and for communicating the carrier signals without substantial phase distortion.

In a fourth embodiment, the present invention is a communication apparatus for communicating electrical signals through a pair of electrical lines having a characteristic impedance. The apparatus comprises:

first modem means for producing a modulated carrier signal having a first preselected frequency and demodulating a modulated carrier signal having a second preselected frequency;

first transmitter means having an output impedance, connected to the first modem means, for transmitting the modulated carrier signal at the first preselected frequency;

first receiver means having an input impedance, connected to the first modem means, for receiving the modulated carrier signal having the second preselected frequency;

first coupler means connected between the pair of electrical lines and said first transmitter and receiver means for matching the impedance of said first transmitter and receiver means to the characteristic impedance of the pair of electrical lines, said first coupler means comprising two LCR circuits, each of the LCR circuits comprising at least one capacitor and at least one resistor connected in parallel to each other and in series to the pair of electrical lines and a linear phase means for communicating the carrier signals without significant phase distortion;

second modem means for producing a modulated carrier signal having the second preselected frequency and demodulating a modulated carrier signal having the first preselected frequency;

second transmitter means having an output impedance, connected to the second modem means, for transmitting the modulated carrier signal at the second preselected frequency;

second receiver means having an input impedance, connected to the second modem means, for receiving the modulated carrier signal having the first preselected frequency;

second coupler means connected between the pair of electrical lines and said second transmitter and receiver means for matching the impedance of said second transmitter and receiver means to the characteristic impedance of the pair of electrical lines, said second coupler means comprising two LCR circuits, each of the LCR circuits comprising at least one capacitor and at least one resistor connected in parallel to each other and in series to the pair of electrical lines and a linear phase means for communicating the carrier signals without significant phase distortion.

In yet a fifth embodiment, the present invention is a communications apparatus for communicating electrical signals through an electrical line having a characteristic impedance comprising:

modulator means for modulating the electrical signals to produce a modulated carrier signal having a preselected frequency;

transmitter means having an output impedance, connected to the modulator means for transmitting the modulated carrier signal;

first coupler means connected between the electrical line and the transmitter means for matching the output impedance of the transmitter means to the characteristic impedance of the electrical line, the first coupler means comprising linear phase means for communicating the modulated carrier signal to the electrical line without substantial phase distortion and capacitor means for resonating with the linear phase means at the preselected frequency;

demodulator means for demodulating the carrier signal on the electrical lines to produce a demodulated carrier signal having the preselected frequency;

receiver means having an input impedance connected to the demodulator means for receiving the modulated carrier signal;

second coupler means connected between the electrical line and the receiver means for matching the input impedance of the receiver means to the characteristic impedance of the electrical line, the second coupler means comprising linear phase means for communicating the modulated carrier signal to the receiver means without substantial phase distortion and capacitor means for resonating with the linear phase means at the preselected frequency, wherein the linear phase means for each of the first and second coupler means comprises air-core transformer means comprising a primary coil having a first diameter, a secondary coil having a second smaller diameter, the secondary coil extending coaxially within the primary coil such that an air-gap is created between the primary and the secondary coils, and capacitor means connected between the primary coil and the electrical line wherein the primary coil and the capacitor means are matched to the characteristic impedance of the electrical line at a preselected bandwidth, wherein the primary coil includes a resistive component, and wherein for half duplex communications, the resistive component of the primary coil connected to the transmitter means is around 1 ohm and the resistive component of the primary coil connected to the receiver means is around 1 ohm.

In a sixth embodiment, the present invention is a communication apparatus for communicating electrical signals through an electrical line having a characteristic impedance, the apparatus comprising:

modulator means for modulating the electrical signals to produce a modulated carrier signal having a preselected frequency;

transmitter means having an output impedance, connected to the modulator means for transmitting the modulated carrier signal; and first coupler means connected between the electrical line and the transmitter means for matching the output impedance of the transmitter means to the characteristic impedance of the electrical line, the first coupler means comprising linear phase means for communicating the modulated carrier signal to the electrical line without substantial phase distortion and capacitor means for resonating with the linear phase means at the preselected frequency.

BRIEF DESCRIPTION OF THE SEVERAL VIEWS OF THE DRAWING

FIG. 13 is a schematic diagram of a coupling for a power line from phase to ground;

DETAILED DESCRIPTION OF THE INVENTION

Figure 4:
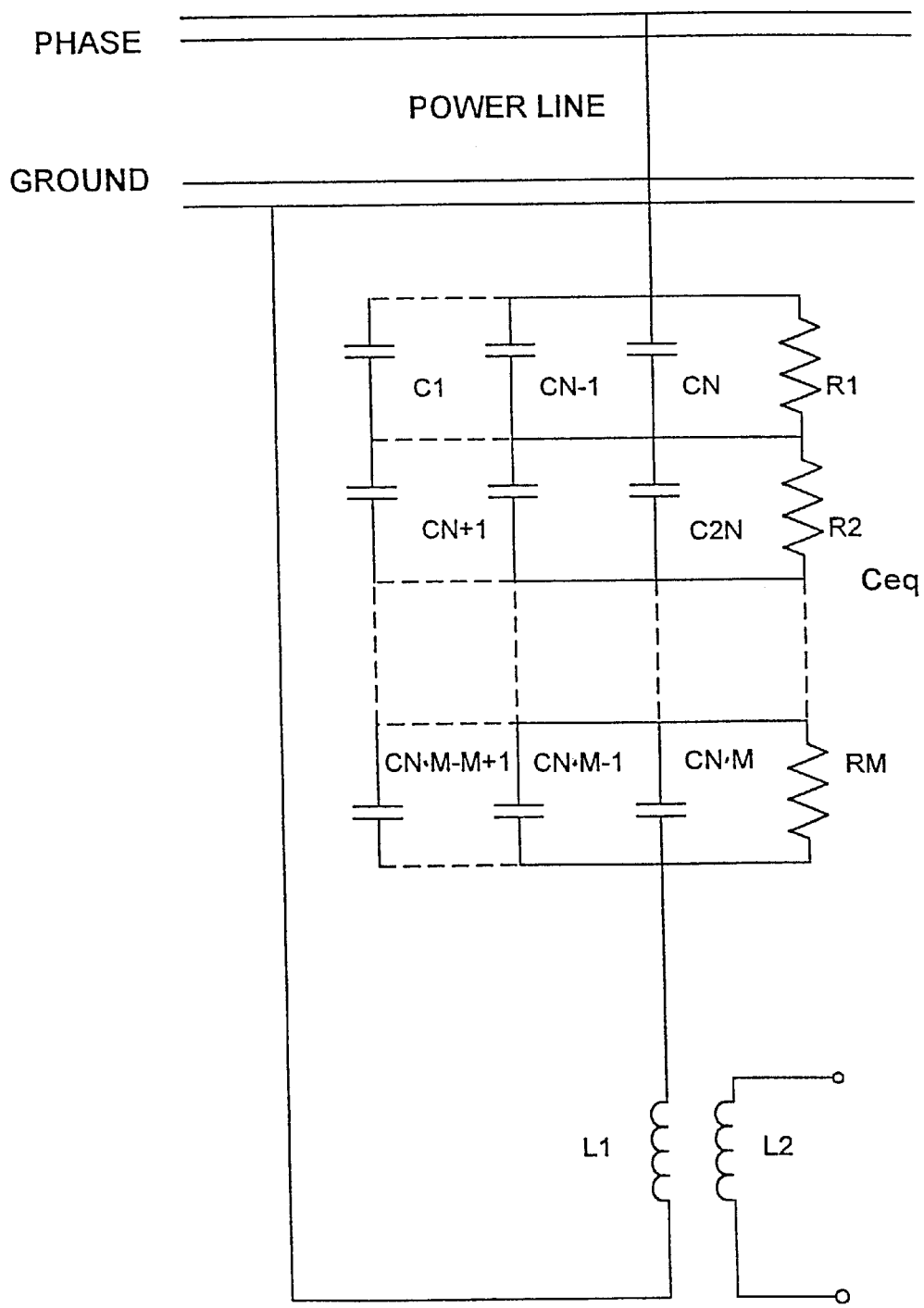
FIG. 4 is a schematic diagram of a phase shift linear coupler of the present invention.

The present invention presents a solution to the fundamental problem of matching the electrical line characteristic impedance with the line coupler. The present invention, characterized in FIG. 4, has two coaxial solenoids or air-coils of different diameter with primary and secondary inductances L1 and L2 respectively. Both L1 and L2 are inductively and capacitively coupled creating an air-core transformer (see FIG. 9A). Preferably, the air-gap is filled with resin which insulates the AC current from the transceiver. That is, filling the air gap with resin reduces inductive loading effects from the coupler secondary to the primary by using the capacitance created in the air core transformer. The size of the gap is selected to reduce inductive loading effects from the coupler secondary to the primary. A coupling capacitor, Ceq, is provided which is significantly larger than a static capacitor, Cs (FIG. 20), so that the static capacitor does not mistune the desired carrier frequency.

Inductive loading effects from the secondary to primary of the air-core transformer are minimized at the transmit frequency. The effective transceiver input, as seen at the primary, is equal to the resistance of the primary winding (Rt or Rr). This value can be chosen to optimally match the line characteristic. When Zo equals the resistance (Rt) of the primary winding of the air-core transformer, about 25% of the source power can be coupled into the line through the power line coupler. Note that Zo varies between 5 and 150 ohms on distribution lines and 1 and 20 Ohms on 120/240V network lines depending on loading conditions. Since insertion loss increases rapidly for termination impedances where the primary winding impedance is greater than Zo (as compared to primary winding impedance less than Zo), a prudent design choice is to use a value of primary winding resistance approximately equal to the minimum value of the line characteristic impedance, Zo.

Figure 1:
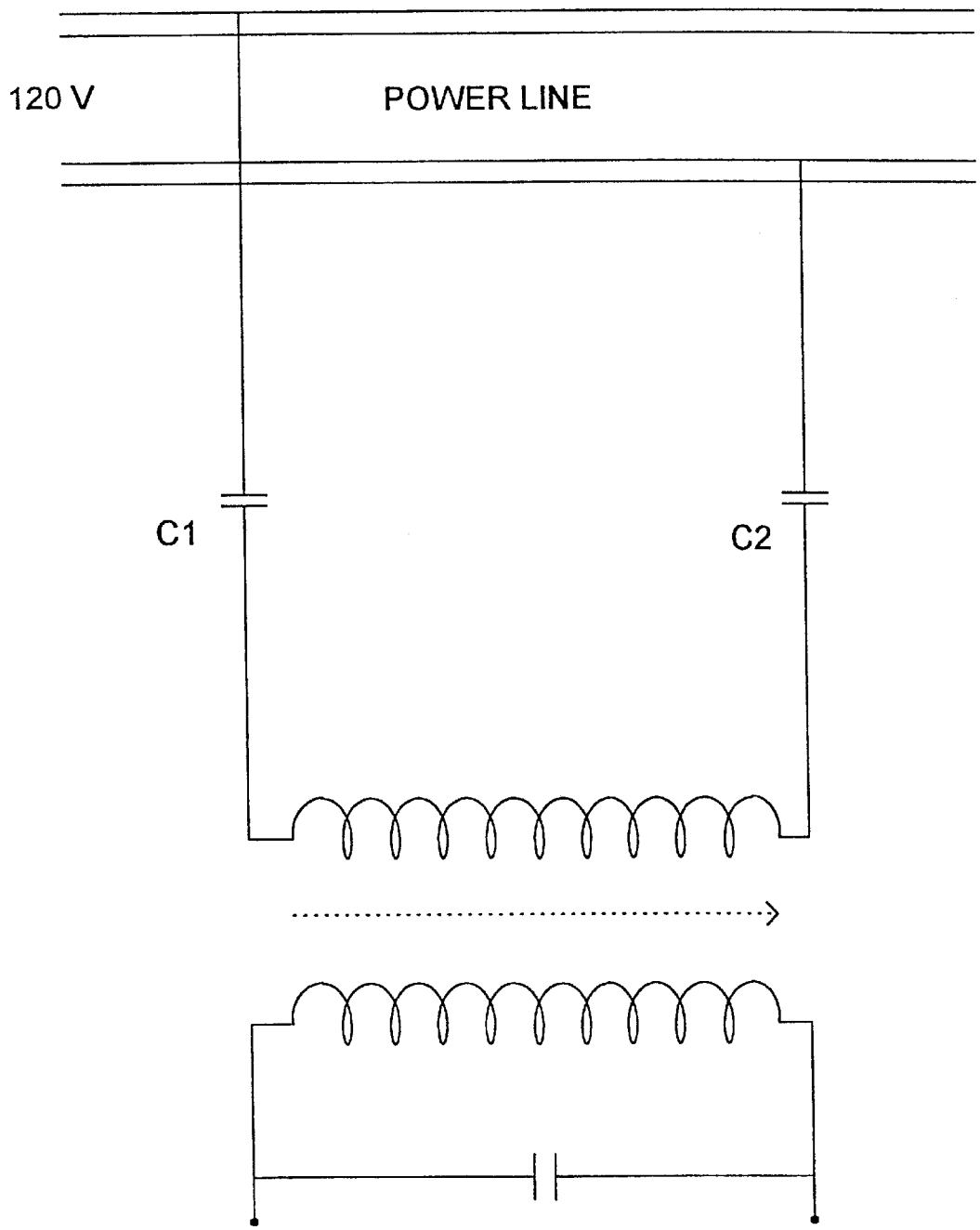
FIG. 1 is a schematic diagram of a prior art duplexing coupler on a low voltage power line.
Figure 2:
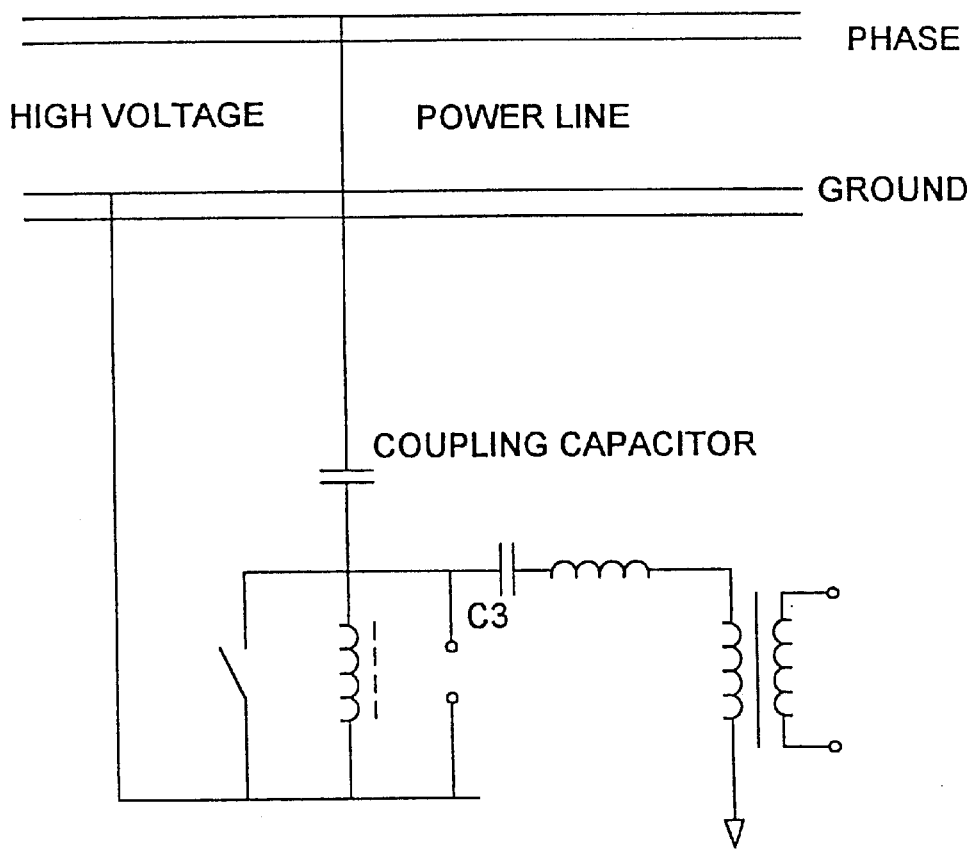
FIG. 2 is a schematic diagram of a prior art duplexing coupler on a high-voltage power line.
Figure 3:
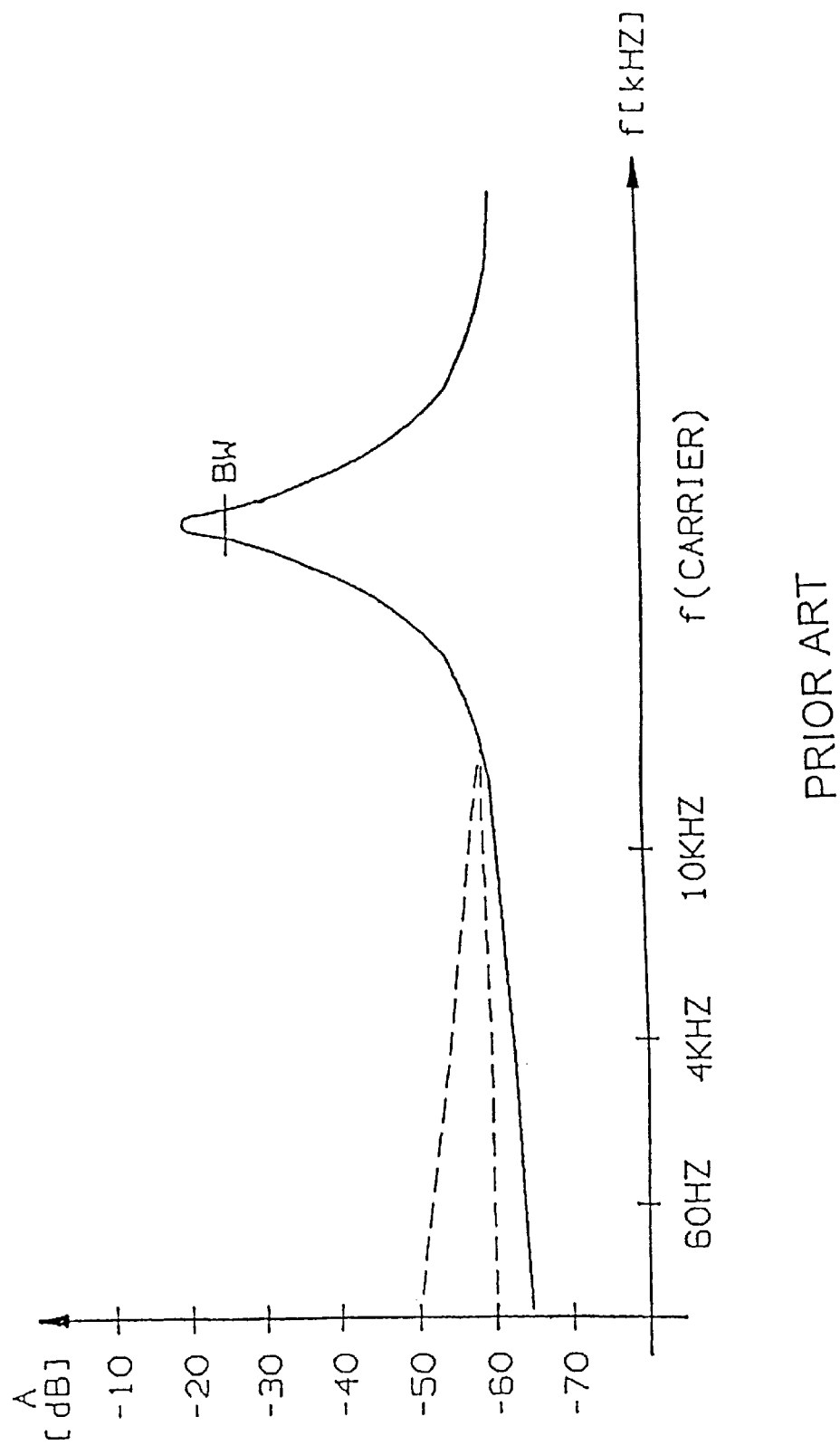
FIG. 3 is a graphical illustration of the frequency characteristics of a prior art serial LC coupler.
Figure 5:
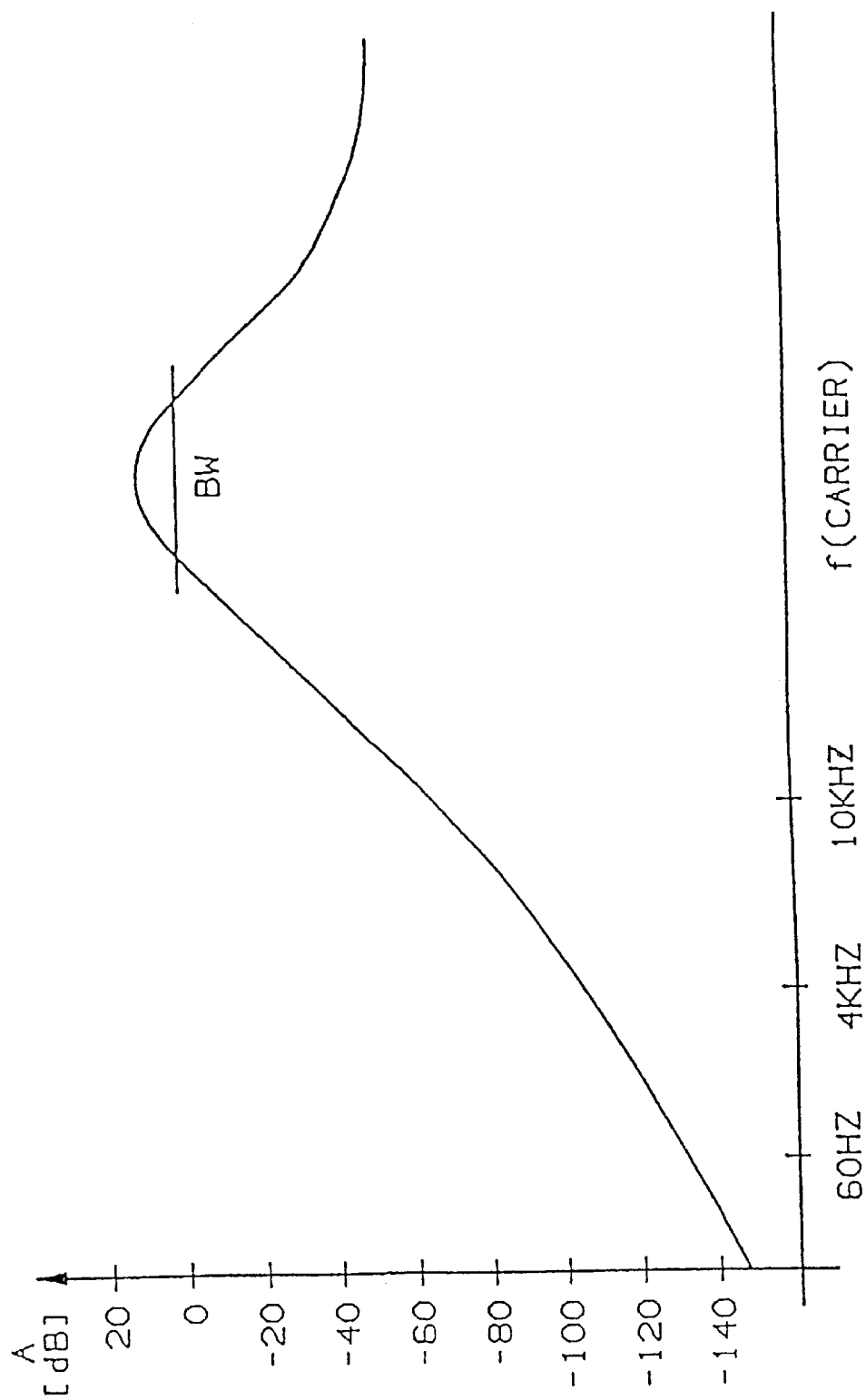
FIG. 5 is a graphical illustration of the frequency characteristics of the phase shift linear coupler of the present invention.

The advantage of an air-core transformer in the novel coupler is exhibited by the frequency response shown in FIG. 5. There is a considerably greater bandwidth around the center frequency when comparing it to the response of a traditional coupler which uses a magnetic-core transformer (FIG. 3).

A significant reduction of 60 Hz harmonics are observed at the secondary side of the novel coupler. This reduction can exceed 20 dB over a wide band. Most noise generated on power lines by AC motors and equipment has a large reactive source impedance. This type of noise experiences significant loss through the novel couplers due to the coupler's low resistive impedance at or around the carrier frequency of the transmission or reception. In contrast, the transfer characteristic of ferrite or iron core couplers typically has a high Q (FIG. 3), which is advantageous in theory for reducing the effects of the harmonics outside the bandwidth, but in actuality constrains the useful transmission bandwidth of the power-line carrier and does not provide noise attenuation inside the bandwidth. The wide bandwidth noise rejection of the novel coupler obviates the need for a sinx/x type receive filter for harmonic rejection. This implies that no separate receiver is required, other than the coupler, for high speed transmission.

Another significant aspect of the design is the phase linearity achieved. The matching of the line impedance and the use of air-core transformers are responsible for the amount of phase linearity achieved. In fact, the phase response of the overall transmission system is linear over a very wide range of frequencies. This implies that almost any desired frequency range can be selected for communication. Also, standing waves are virtually suppressed due to the low resistive matching at both ends of the line. The peak amplitude of the first reflection is around 40 mV, which is small compared to the transmitted signal amplitude of a few volts. Setting the receiver threshold above 40 mV can eliminate any remaining source errors. There is also an elimination of standing waves on the line. This implies that there are no antinodes, places where the magnitude of the standing wave is zero and no transmission can occur, at points on the line situated at odd multiples of lambda/4 away from the end of the line.

The other practical advantage of the air-core coupler is that the transmitted signal level into the power line or electrical line is about the same at every outlet (time and location independent) due to the low resistive matching to the electrical line characteristic impedance at a pre-selected carrier frequency. Consequently, a low radiation emission level is the same from every outlet as well. Effecting a low radiation emission level is very important to meet the FCC 15.31 (d) requirements for transmissions above 1.7 MHz. The usage of a ferrite coupler does not provide such low resistive matching to the power line characteristic impedance and thus, the radiation emission level that can be measured is time and location dependent and is in the large range (typically measured at the same transmission level about 6 to 30 dB higher then the allowed FCC limit).

The best frequency range 120/240 V power lines is 70–160 Khz (this includes LAN operations). For data transmission through power line transformers the optimal frequency is the 25–45 Khz band. For very high speed LAN applications a frequency range of 70–480 Khz is preferred. Finally, the novel coupler of the present invention is equally applicable to any voltage AC, DC, phone, twisted pair or coaxial line.

In accordance with the present invention, apparatus for power-line communications is disclosed. The power-line communication apparatus comprises: modulator and demodulator means for modulating or demodulating a carrier signal having a frequency to be transmitted or received over an electrical line; transmitter and receiver means for transmitting or receiving the modulated carrier signal having the frequency to or from a coupler means; and coupler means comprising capacitor means and air-core transformer means which couples the apparatus to an electrical line.

In accordance with a major aspect of the present invention, an air-core transformer comprising primary and secondary windings function (with resonating capacitor networks) as a phase shift linear coupler, which resistively matches the characteristic impedance of the line and reduces noise at bandwidth. Because the windings (which function as solenoids) create a small static capacitance across an air gap, the secondary windings along with the static capacitance function as a high pass filter.

The novel air-core coupler has significantly less phase distortion then the traditional ferrite or iron couplers. The measured phase distortions using the air-core coupler over the power line varies depending on the carrier frequency. For example, using a 150 Khz carrier frequency and 60 Khz bandwidth, the phase distortion has been measured typically less than about 30 degrees. Using a 21 MHz carrier frequency and 5 MHz bandwidth, the phase distortion has been measured around 15 degrees. It is estimated that when the Q is equal to 3 the phase distortion is around 30 degree; when the Q is equal to 4 the phase distortion is around 15 degree; when the Q is equal to 5 the phase distortion is around 10 degree; and when the Q is equal to 6 the phase distortion is less then 10 degrees. Consequently, depending on the speed and modulation/demodulation technique requirements of the communication system, the air-core coupler can reach much higher communication speeds over an electrical line than the traditional couplers because the air-core coupler is able to provide phase linear communication without substantial phase distortion.

The novel coupler can be connected to a pair of power lines several ways. The most preferred way is to connect the Ceq capacitor (FIG. 4) to the power line phase and the air-core coupler primary L1 to the Ceq capacitor and to the neutral of the power line. It is common-that 120, volt outlets do not always have proper connections to the hot and neutral. The novel coupler capacitor Ceq can be connected to the neutral and the primary inductor L1 to the hot. The novel coupler capacitor Ceq can also be connected to the neutral and the primary inductor L1 to the ground. Furthermore, the novel coupler can be connected between two phases as well as between phase and ground.

The communications apparatus of the present invention has numerous applications. The most apparent applications are in electricity and gas meter readings, the switching of remote control devices, and data communications between computers or devices including processors over power lines. By way of example, the present invention makes it possible to transmit electricity and gas meter readings over power-lines for large numbers of customers. Such readings can be transmitted at low power, at high data rates, over long distances and directly through power line transformers. In a hypothetical system, such readings could be made by a computer with addressable data using two frequencies. The data travels between a computer at the electric company and any homes connected to the electric company. The data travels on house 120/240/480 volt lines to a distribution 13,800/22,000/69,000 volt lines and through all associated distribution transformers. In addition, public phone systems in trains and internal security systems in homes may be set up over high voltage power-lines using addressable data transmitted through the phone system.

The present invention can be further utilized to control large or small machines in factories or mines. The apparatus of the present invention has been used to transmit data between computers and printers at speeds in excess of 9600 baud. Other applications include data transmission through phone lines, coaxial lines and any high voltage DC power lines.

The present invention can even use higher than 30 MHz carrier frequency for transmission over the power line. The size of such an air-core coupler is very small, around 2 to 3 mm primary diameter. For better stability, the air-core coupler can be placed into low shrinkage resin or molded into non-conductive plastic. Using such air-core or dielectric-core coupler technology, several Mbps of communication speed can be achieved over the power line, both on low voltage 120V/240 V and high voltage, up to 765 KV, lines.

Figure 6:
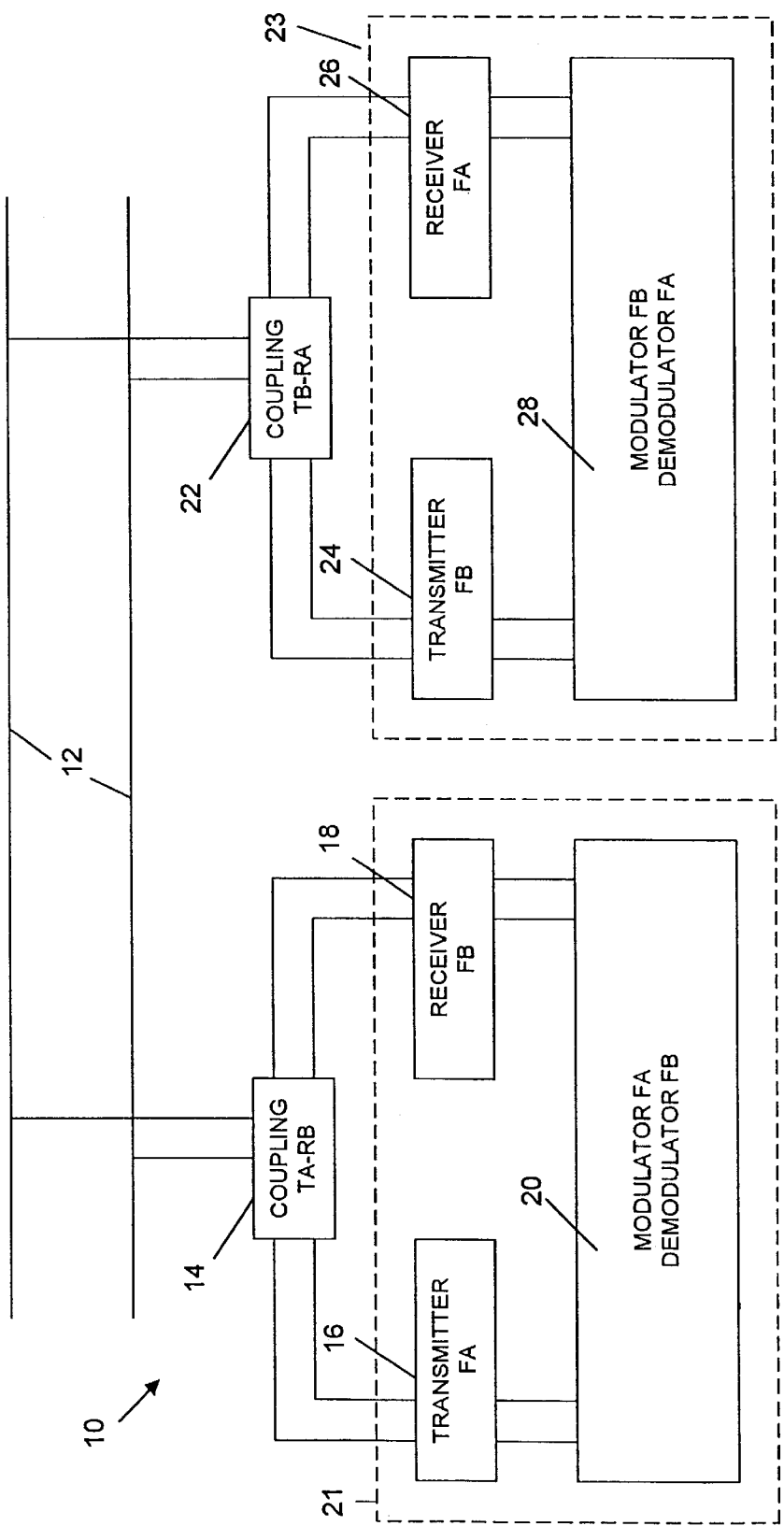
FIG. 6 is a schematic block diagram of a power-line communication apparatus in accordance with the present invention.
Figure 6A:
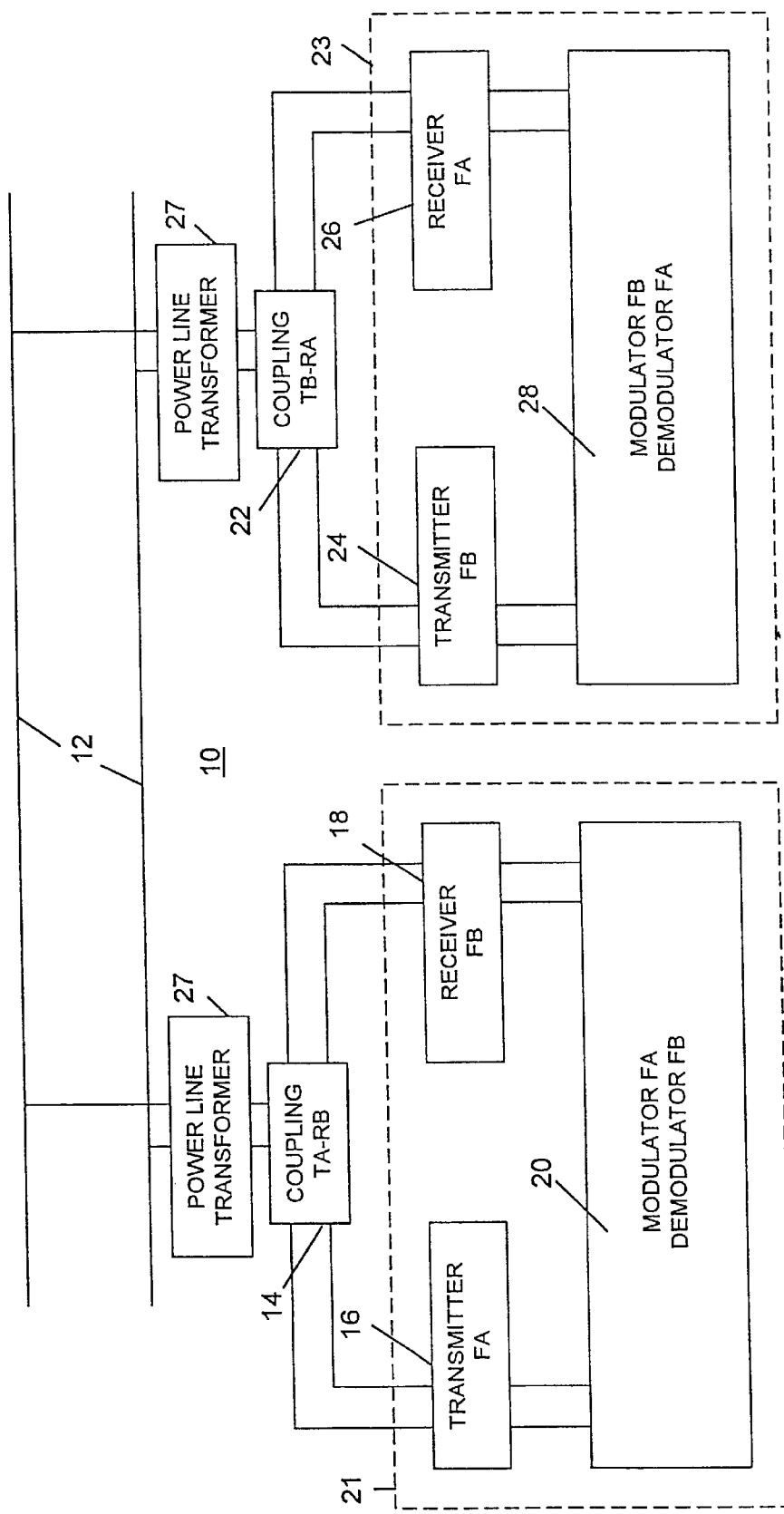
FIG. 6A is a schematic block diagram of a power-line communication apparatus in accordance with the present invention including power-line transformers.

Referring now to the drawings, wherein like numbers designate like or corresponding parts throughout each of the several views, there is shown in FIGS. 6 and 6A block diagrams of a power-line communication apparatus 10 according to the present invention for use in low power applications (up to 480 VAC).

The communications apparatus 10 shown is coupled to a pair of power-lines 12. The communications apparatus 10 generally comprises first coupling means 14, first transmitter 16, first receiver 18, and first modulator/demodulator means 20. The first transmitter 16, first receiver 18, and first modulator/demodulator means 20 comprise a first modem means 21. The communications apparatus 10 further comprises, at a second location along the power-line 12, second coupling means 22, second transmitter 24, second receiver 26, and second modulator/demodulator means 28. The combination of the second transmitter 24, the second receiver 26 and the second modulator/demodulator means 28 comprise a second modem means 23.

Figure 7:
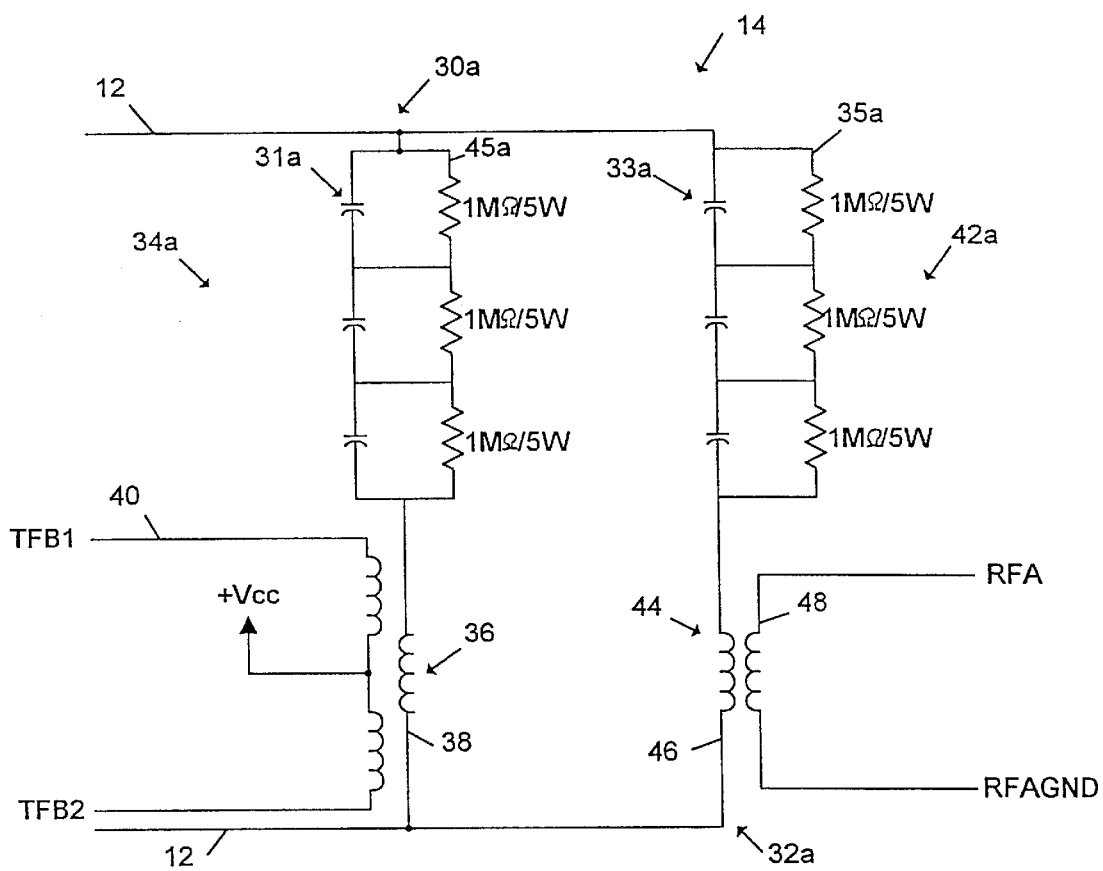
FIG. 7 is a schematic diagram of first coupling means in accordance with the present invention, which corresponds to the coupling TA-RB shown in FIGS. 6 and 6A.
Figure 8:
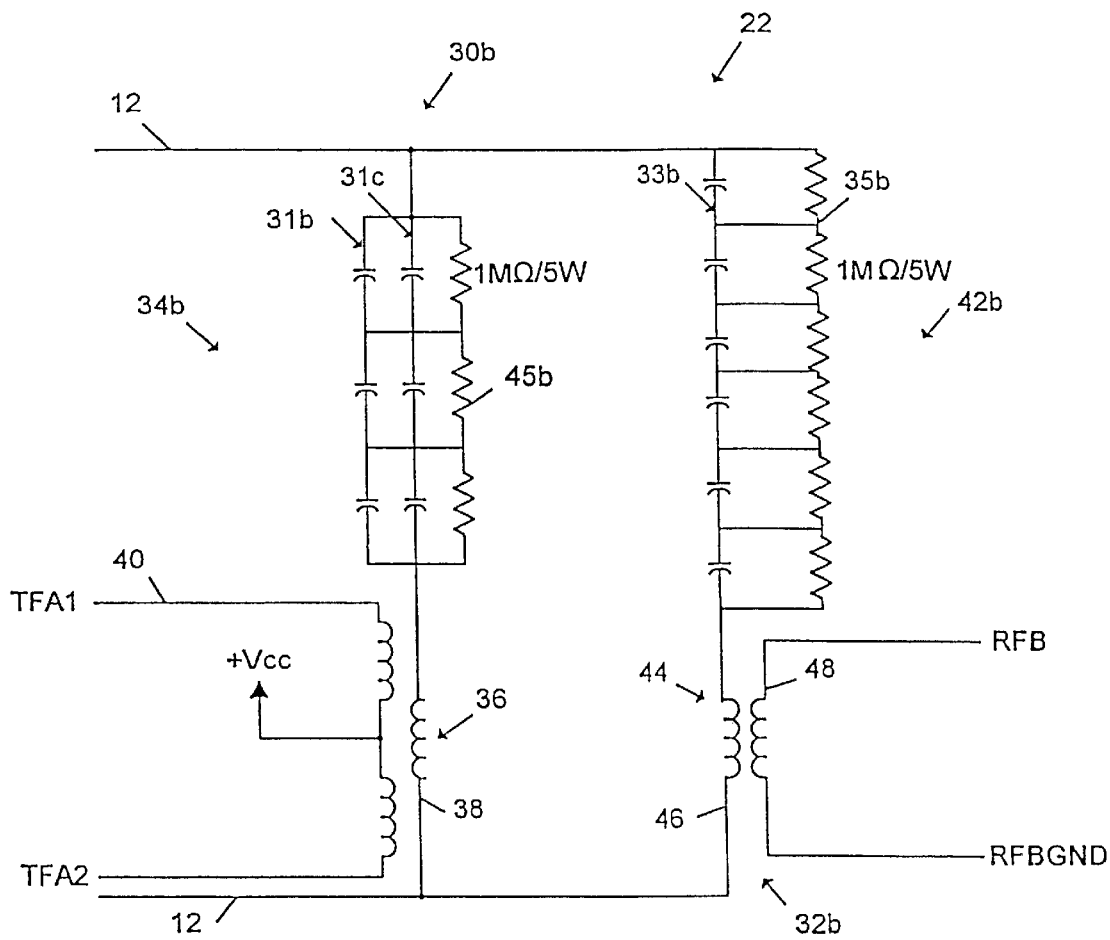
FIG. 8 is a schematic diagram of second coupling means in accordance with the present invention, which corresponds to the coupling TB-RB shown in FIGS. 6 and 6A.

As explained in greater detail below, the first and second coupling means 14, 22 include a pair of serial LC circuits (FIGS. 7 and 8) which are coupled to the pair of power-lines 12. Referring to FIGS. 6A, 7 and 8, the first and second coupling means 14, 22 are coupled to respective power-line transformers 27. Each of the serial LC circuits in- a respective one of the coupling means 14, 22 resonate at a given frequency. The LC circuits include a plurality of capacitors which are connected in a series and parallel configuration. (See also FIG. 4.) The first and second coupling means 14, 22 further incorporate novel air-core transformers, which serve as the inductive (L) component of the respective LC circuits, for both transmission and reception. It is to be noted that while the present invention is being described in the context of two identical communications apparatus, either LC circuit may be configured to function as a simple receiver or transmitter.

The first transmitter 16 is coupled to-the first coupling means 14, and is capable of transmitting digital data signals carried by a first carrier frequency FA across the pair of power-lines 12, and as shown in FIG. 6A, through the power line transformers 27. The first receiver 18 is coupled to the first coupling means 14, and is capable of receiving digital data signals carried by a second carrier frequency FE from the pair of power-lines 12. The first modulator/demodulator means 20 is coupled between the first transmitter 16 and the first receiver 18, and modulates the digital data signals carried by the first carrier frequency FA, and demodulates the digital data signals carried by the second carrier frequency FB.

In a similar manner, at the second location along the power-lines 12, the second transmitter 24 is coupled to the second coupling means 22. The second transmitter 24 is capable of transmitting the digital data signals to be carried by the second carrier frequency FB across the pair of power-lines 12, and as shown in FIG. GA through the power-line transformers 27. The second receiver 26 is coupled to the second coupling means 22, and is capable of receiving the digital data signals carried by the first carrier frequency FA from the pair of power-lines 12. The second modulator/demodulator 28 is coupled between the second transmitter 24 and the second receiver 26, and modulates the digital data signals carried by the second carrier frequency FB and demodulates the digital data signals carried by the first carrier frequency FA.

The first and second carrier frequencies FA, FE preferably comprise frequencies up to about 11 MHZ. For most high voltage, long distance communications, the first and second carrier frequencies FA, FB will typically comprise frequencies that are less than about 160 Khz, having a bandwidth of less than about 20 Khz. When used for communication through the power line transformers 27, FA and FB will typically comprise frequencies below 90 Khz (preferably about 25–45 Khz) with a bandwidth of about 6 Khz. The serial LC circuits (FIGS. 7 and 8) of the first and second coupling means 14, 22 each comprise resistive matching means, described in greater detail below.

Referring now to FIGS. 7 and 8, the first coupling means 14 (FIG. 7) and the second coupling means 22 (FIG. 8) each include a pair of serial LC circuits 30, 32 which resonate at the carrier frequencies FA, FB. It will be appreciated by those skilled in the art that for FSK (Frequency Shift Key) applications FA corresponds to F1 and F2 and FB corresponds to F3 and F4. In FIG. 7, the serial LC circuit 30a resonates at the second carrier frequency FB and the serial LC circuit 32a resonates at the first carrier frequency FA. In FIG. 8, the serial LC is circuit 30b resonates at the first carrier frequency FA, and the serial LC circuit 32b resonates at the first carrier frequency FB.

The LC circuits 30, 32 include respective serially and parallely connected capacitor networks 34, 42. In FIG. 7, the capacitor network 34a includes three serially connected capacitors 31a, each having a parallel connected resistor 45a and the capacitor network 42a includes three serially connected capacitors 33a, each having a parallel connected resistor 35a. In FIG. 8, the capacitor network 34b includes three serially connected capacitors 31b, each having a parallel connected capacitor: 31c and a parallel connected resistor 45b. The capacitor network 42a includes six serially connected capacitors 33b, each having a parallel connected resistor 35b. The resistors 35, 45 are provided to evenly divide down the AC voltage on each capacitor 31, 33, which stabilizes operation, minimizes spiking and affords lightning protection. Preferably, the resistor values should be rated at 1 Megaohm per 5 Watts and the capacitors 31, 33 should be 200 VAC capacitors. The resistors 35, 45 should preferably be thick film (i.e. carbonless). The Q point of the capacitors 31, 33 should similarly be high. In operation, the first and second serial LC circuits 30, 32 should be placed into a resin for good insulation when used with operating voltages up to 660 V. At operating voltages above 660 V, the capacitors 31, 33 should be separately placed in an oil filled insulator and an associated air core transformer (described below) placed into a resin.

It is to be appreciated that the capacitor networks 34, 42 create equivalent capacitances Ceq1 and Ceq2 for transmission and reception, respectively. The capacitor networks 34, 42 are connected to air-core transformers, discussed below, which function as the inductive element (L) of the LC circuit. Ceq1 and Ceq2 resonate with a primary winding of the air-core transformers.

The first serial LC circuit 30 also includes a first air core transformer 36 having a primary winding 38 and a smaller, secondary winding 40 situated coaxially within the primary winding 38. The second serial LC circuit 32 includes a second air core transformer 44 having a primary winding 46 and a smaller, secondary winding 48 situated coaxially within the primary winding 46.

The first capacitor network 34 is connected in series between one of the power-lines 12 and the primary winding 38 of the first air core transformer 36. The primary winding 38 of the first air core transformer 36 is thereafter serially connected to the other power line 12. The secondary winding 40 of the first air core transformer 36 is connected to its respective transmitter 16, 24. The second capacitor network 42 is serially connected between one of power lines 12 and the primary winding 46 of the second air core transformer 44. The primary winding 46 of the second air core transformer 44 thereafter being serially connected to the other power line 12. In transmitting data over the power lines, the air-core transformer coupled with the coupling capacitor provides resistive matching to both sides of the power line transformer to establish a phase shift linear system which reduces coupling losses through the power line transformer.

Figure 9A:
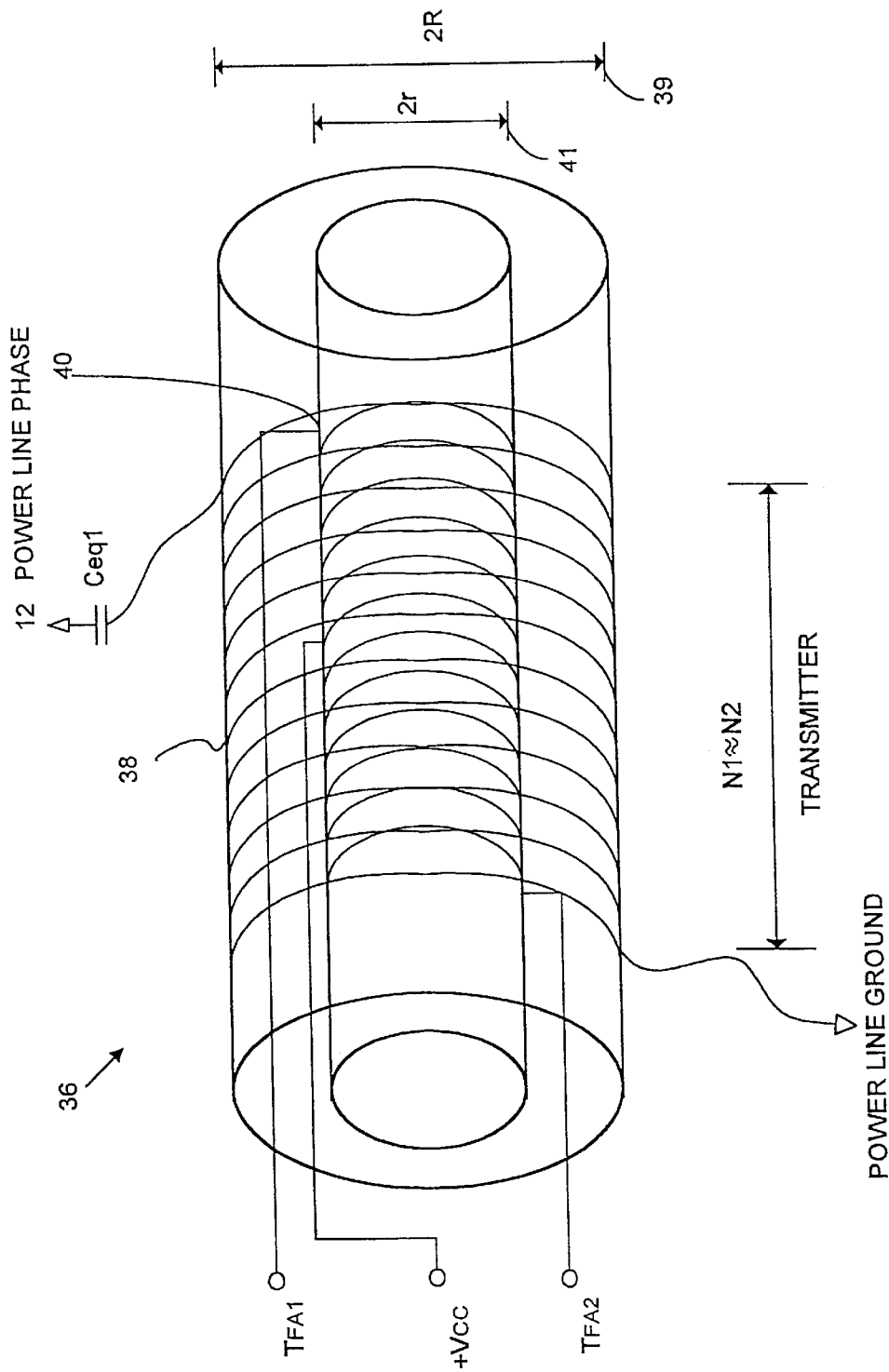
FIGS. 9A and 9B illustrate a coaxially extended air-core transformer with a coupling capacitor in accordance with the present invention.
Figure 9B:
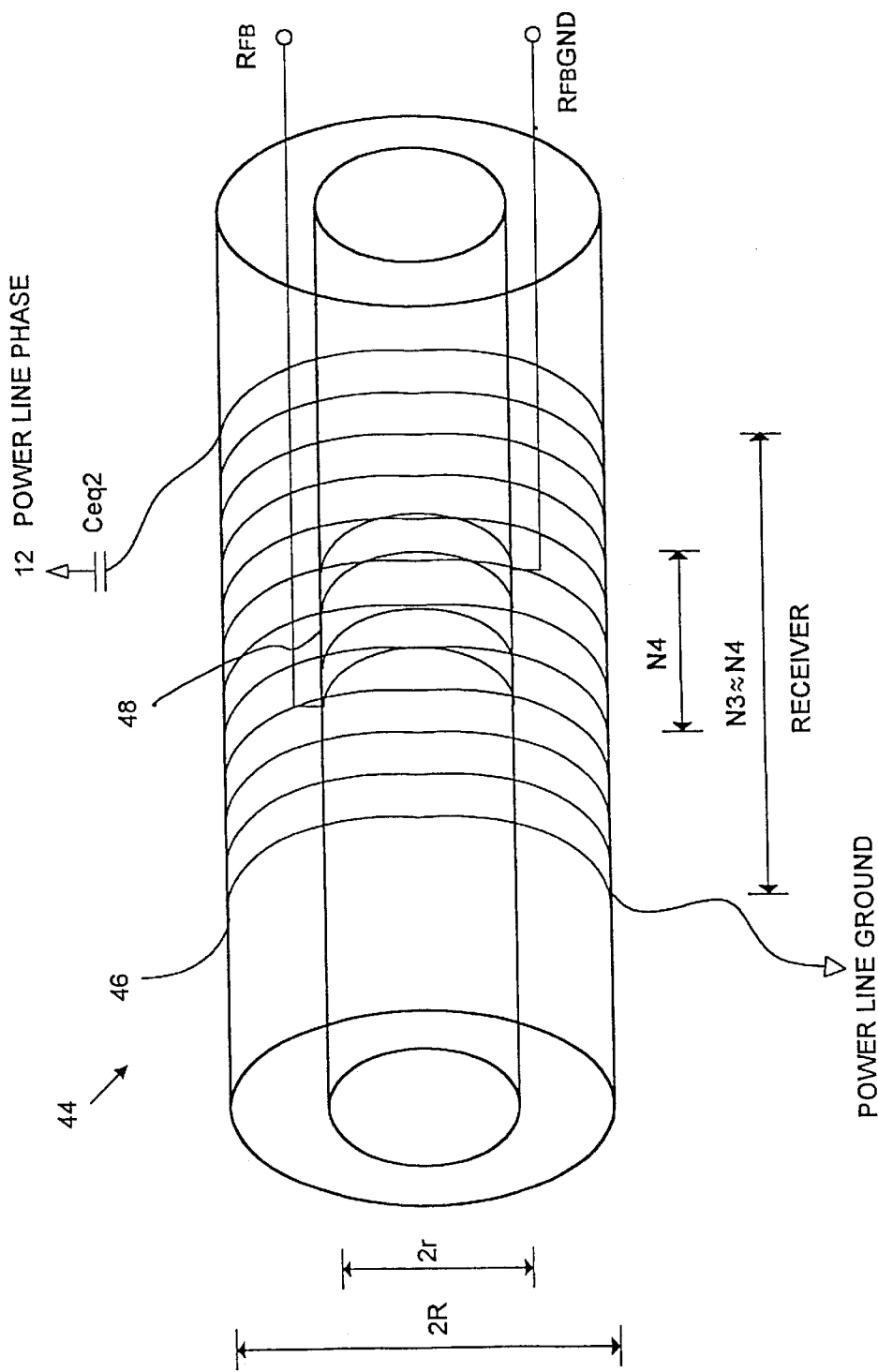

Referring to FIGS. 9A–9B, the first and second air-core transformers 36, 44 of the present invention are described in greater detail. The first and second air-core transformers 36, 44 have a novel, air coil structure which functions as respective inductively and capacitively coupled air-core transformers for both transmission and reception. FIG. 9A illustrates the first air-core transformer 36, which is connected to the transmitter 16, 24, respectively, with the coupling capacitor network (Ceq1) 34., As shown in FIG. 9A, the first air-core transformer 36 is connected in series with Ceq1 and the power line 12. The transformer 36 is phase shift linear and comprises the primary winding 38 and the smaller, coaxial secondary winding 40. The primary winding 38 has a winding diameter 2R 39 which is greater than a diameter of the secondary winding 2r 41. Accordingly, an air gap is created between the primary winding 38 and the secondary winding 40. Of particular significance is the fact that both the primary and secondary windings 38, 40 of the first air-core transformer 36 can have about the same number of turns (designated by N1=N2), and are thus at a 1:1 ratio. Accordingly, in contrast to prior art devices, the transmitter 16 does not require a high transmission voltage. Further Ceq1 is set to resonate with the primary winding 38 at the carrier frequency FA, thus creating a band pass filter at the carrier frequency FA. This maximizes the current at the carrier frequency FA.

The values of Ceq1 and the resistors 35, 45 are set to generate a large voltage loss at frequencies less that 10 Khz (thus encompassing 60 Hz and its harmonics). It has been discovered that a deep high pass filter, which is part of a coupler, that can attenuate 60 Hz by over 100 dB, compared to the received signal level, will attenuate significantly 60 Hz harmonics. Thus, the significantly reduced 60 Hz signal cannot generate a large enough current to pass static capacitance. The static capacitance with the secondary winding 40 creates a very deep high pass filter which removes the 60 Hz signal by over 100 dB. That is, for transmission, the resistivity of the primary coil 38 is roughly equal to the lowest known value of the characteristic impedance of the power line 12.

Referring now to FIG. 9B, the second air-core transformer 44, which is connected to the receiver 18, is shown. The second air-core transformer 44 is connected to the power line 12 by way of Ceq2. As with the first transformer 36, the second air-core transformer 44 comprises a phase shift linear transformer wherein the primary winding 46 has a first diameter 2R 47 and the secondary winding 48 has a second diameter 2r 49, with the second diameter 49 being smaller than the first diameter 47 such that an air gap is created therebetween, and thus a static capacitance, is created between the respective primary and secondary windings 46, 48. In the second transformer 44, the ratio of the primary and secondary windings 46, 48 is preferably about 1:1. While this ratio can be altered or modified, such a change requires a resultant alteration in the size of the air gap, i.e. the relative ratio of 2R and 2r. The capacitor network (Ceq2) 42 is set to resonate with the primary winding 46 at the carrier frequency FB, thus creating a band pass filter at the carrier frequency FB.

In operation, the power line voltage is significantly reduced by the capacitor network 42 Ceq2 and the resistors 35. Thus, the static capacitance with the secondary winding 48 significantly attenuates the 60 Hz signal and its harmonics, thus effectively functioning as a high pass filter. The carrier frequency voltage is thereby maximized. The second air-core transformer 44 produces a wider phase linear bandwidth than previous systems. As previously discussed, the bandwidth characteristics of the present invention are shown in FIG. 5. For good reception, the resistivity of the primary winding 46 can be equal or greater than the lowest characteristic impedance of the power line 12 at the frequency of interest.

The air-core in the coupling transformer gives negligible pulse dispersion and allows for a low resistive matching at the coupler which significantly reduces the go power line noise at the coupler output over a wide bandwidth establishing a stable amplitude transfer function with linear phase characteristic over the transmission line. Because of the low resistive matching of the coupler to the line characteristic impedance, it eliminates standing waves, which implies that there are no anti-nodes at points on the line situated at odd multiples of lambda/4, (3 lambda/4 etc.) away from the end of the line from which no transmission can occur. The low resistive matching also enables communication over long distances.

From a design standpoint, the philosophy is to minimize the 60 Hz line current and its harmonics at the output of the coupling means 14, 22. That is, the receiver coupling contains a capacitor network which impedes the 60 Hz high power signal and its harmonics.

For higher voltage power-line coupling the coupling capacitor, Ceq, should have a smaller value:

$$(f)^2(\text{carrier})/(f)^2(60\text{ Hz})$$

ratio determines the $V_{carrier}/V_{60Hz}$ ratio at the output of the coupling means 14, 22.

Preferably, a higher carrier frequency should be used for higher power line voltages. $V_{carrier}$ is measured at the pre-selected carrier frequency at the secondary output of the receiver coupler in Volts. $V_{60Hz}$, measured at the same location of $V_{carrier}$, is the voltage of the 60 Hz.

The above relationships coupled with the capacitive feature of the transformers 36, 44 serve to block the 60 Hz current. The resistive matching serves to reduce power line noise at the bandwidth of interest. The use of an air-core transformer reduces reflected impedances from the secondary side as well as from the power line transformer 27 to the primary side of the air-core transformer. The above makes it possible to communicate directly through power line transformers 27.

Figure 20:
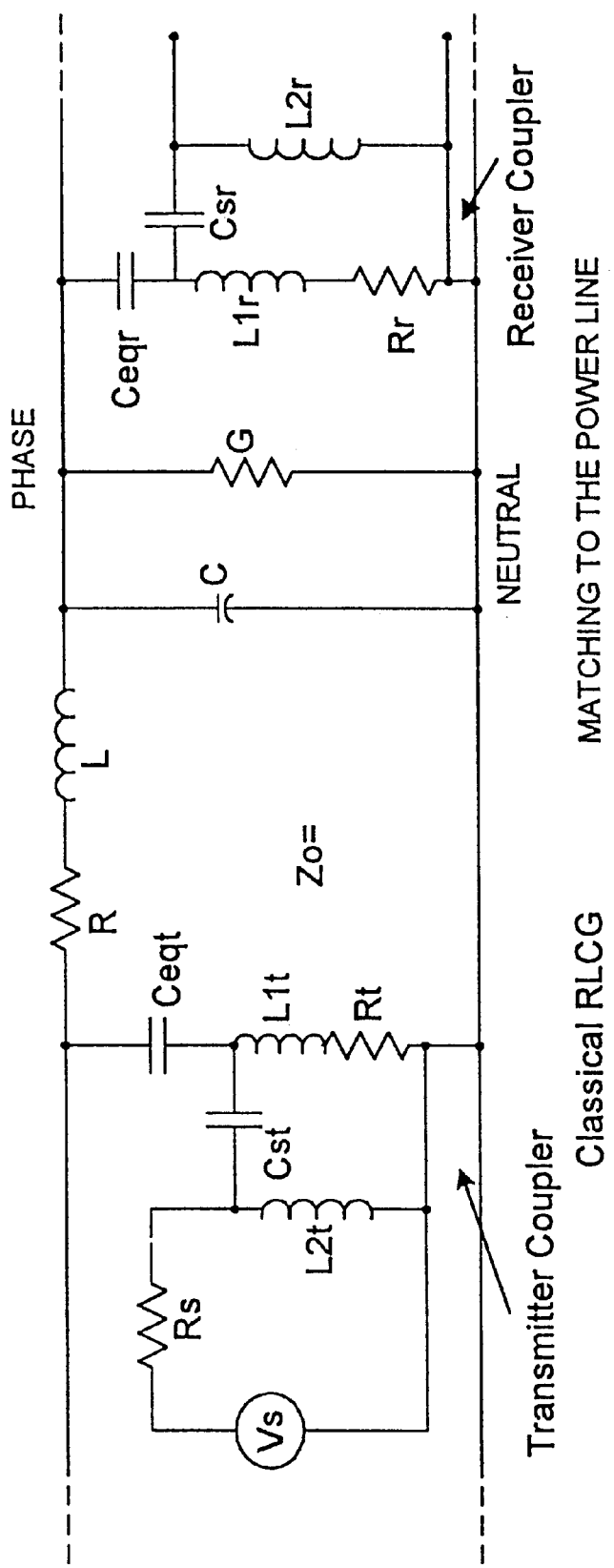
FIG. 20 is a schematic diagram of an equivalent circuit model for a power-line carrier communication system with resistive matching to the power line characteristic impedance by the coupler.

The theoretical operation of the circuit is seen with reference to FIG. 20, an equivalent circuit model for a power-line carrier communication system with matching resistors Rt and Rr. At primary resonation, the LC impedances will be zero at transmission and reception such that the resistivity of the primary coil Rt matches the characteristic impedance of the power line. On the receiver side, Rr can be equal or larger than the characteristic impedance of the power line. Due to the use of the air-core transformer and resistive matching, the whole power line system can be phase shift linearized even through a power line transformer. These relationships facilitate error free and high speed communications over long distances. The coupling means 14, 22 are suitable for communication in association with a wide range of power-line voltages, including high voltage, low voltage, twisted pair, coaxial, and phone line communications, as well as for communication directly through power line transformers.

The coupling means 14, 22 can be applied to LAN (local area network) communications and facilitate communication speeds up to 10 Kilobaud. For LAN communications, the coupling means 14 preferably use a first carrier frequency FA of around 75 Khz (81.5 Khz for FSK) and a second carrier frequency FB of around 111 Khz (117.5 Khz for FSK) over the power-lines 12 of up to about 1 KVAC. Preferably, the first capacitor network 34a connected to the first coupling means 14 has a coupling capacitor equivalent circuit equal to 90 nanofarads. The primary winding 38 of the first air core transformer 36 preferably has a coil diameter of 2.2 cm, #26 gauge magnet wire and the secondary winding 40 has a coil diameter of about 1.7 cm, #28 gauge magnet wire. The second capacitor network 42a preferably has an equivalent circuit equal to 15 nanofarads. The primary winding 46 of the second air core transformer 44 preferably has a diameter of 2.2 cm, #30 gauge magnet wire and the secondary winding 48 has a coil diameter of about 1.7 cm, #28 gauge magnet wire.

On the other side of the system, the first capacitor network 34b connected to the second coupling means 22 preferably has a coupling capacitor equivalent circuit equal to 40 nanofarads (which includes the static capacitance of the air-core transformer 36). The primary winding 38 of the first air core transformer 36 preferably has a coil diameter of 2.2 cm, #26 gauge magnet wire and the secondary winding 40 has a coil diameter of 1.7 cm, #26 gauge magnet wire. The second capacitor network 42b preferably has a coupling capacitance equivalent circuit equal to 33 nanofarads. The primary winding 46 of the second air core transformer 44 preferably has a coil diameter of about 2.2 cm, #34 gauge magnet wire and the secondary winding 48 has a coil diameter of about 1.7 cm, #30 gauge magnet wire.

For duplex operation the resistive matching at the selected frequencies should be less than about 1 ohm for transmission and about 3 to about 5 ohms for reception. For half duplex operation the resistive matching should be about 1 ohm for both transmission and reception. By using suitable transistors (described below) in the modulators/demodulators (modems) 20, 28, shown in FIGS. 10A, 11 and 12, for transmitting, the communication speed can be increased above 9.6 Kbaud over power, twisted pair, and coaxial lines.

The coupling means 14, 22 are also applicable to high voltage power line communication applications in which a 15 KVDC / 4.5 KVAC capacitor can be used for power-line voltages of up to 765 KV for achieving communication speeds up to 9600 baud. In high voltage power line communications, first FA and second FE carrier frequencies of 80 Khz and 115 Khz, respectively, are preferred, and the connections of the first capacitor network 34 and the second capacitor network 42 are somewhat modified over what is shown in FIGS. 7 and 8. For the first coupling means 14, the first capacitor network 34a preferably comprises a 2 nanofarad coupling capacitor for 80 Khz transmission and the second capacitor network 42a comprises a 0.5 nanofarad coupling capacitor for reception. It is to be appreciated that the high voltage power line communications system will be comparatively large, having a height of approximately fifteen feet and will typically be located at a ground station adjacent to a large high voltage transmission line.

Referring to the air-core transformers 36, 44 for high voltage power line communications, the primary winding 38 of the first air core transformer 36 of the first coupling means 14 suitably comprises a coil diameter of 8.9 cm, #24 gauge magnet wire, and the secondary winding 40 has a coil diameter of 6.0 cm, #16 gauge magnet wire. The primary winding 46 of the second air core transformer 44 likewise suitably comprises a coil diameter of 7.3 cm, #26 gauge magnet wire, and the secondary winding 48 has a coil diameter of 4.8 cm, #16 gauge magnet wire. The inductance of the primary winding 46 is calculated according to the equation:

$$L=1/4(pi)^2 f^2 Ceq.$$

The second coupling means 22, under the same circumstances, also includes the first and second capacitor networks 34b, 42b. The first capacitor network 34b suitably comprises a 1 nanofarad coupling capacitor for transmission at 115 Khz, while the second capacitor network 42 comprises a 1 nanofarad coupling capacitor for 80 Khz reception. The primary winding 38 of the first air core transformer 36 comprises a coil diameter of 8.9 cm, #24 gauge magnet wire and the secondary winding 40 has a coil diameter of 6.0 cm, #12 gauge magnet wire. The primary winding 46 of the second air transformer 44 likewise suitably comprises a coil diameter of 8.9 cm, #26 gauge magnet wire and the secondary winding 48 has a coil diameter of about 6.0 cm, #16 gauge magnet wire. It will be appreciated that no ferrite transformer is found within the transmitter 16, 24 and the receiver 18, 26 of the present invention. It is also possible that no receiver 18, 26 is needed. The resistive matching for transmission is about 5 ohms and for reception is about 10 ohms for duplexing operations. A resistive match of approximately 1 to 5 ohms is needed for half duplexing operation where transmission and reception occurs in several locations.

Figure 21:
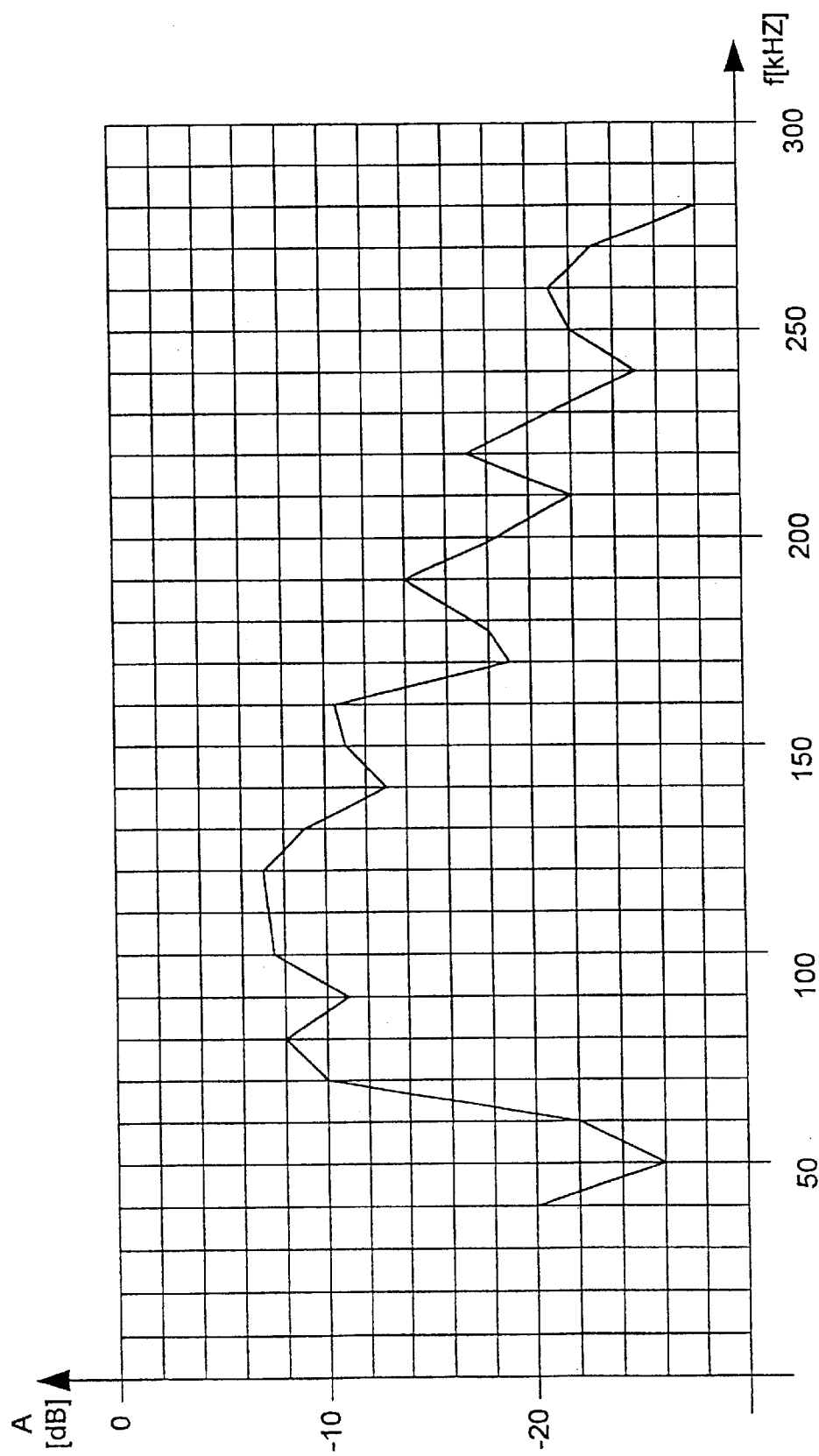
FIG. 21 is a graph of power line attenuation versus carrier frequency on a 35 KVAC power line for a 20 KM distance.

FIG. 21 is a graphical diagram of power-line attenuation versus carrier frequencies on a 35 KVAC power line for 20 KM distances. It has been determined that a 150 ohm load is inadequate for matching conditions due to the loss of signals around 40 Khz. It is presently believed that the best range of communication, as shown by the graph, is from 70 to 160 Khz. As the number of transformers 27 on the power line 12 increases, the attenuation of the power line 12 will increase, especially above 100 Khz.

Figure 22:
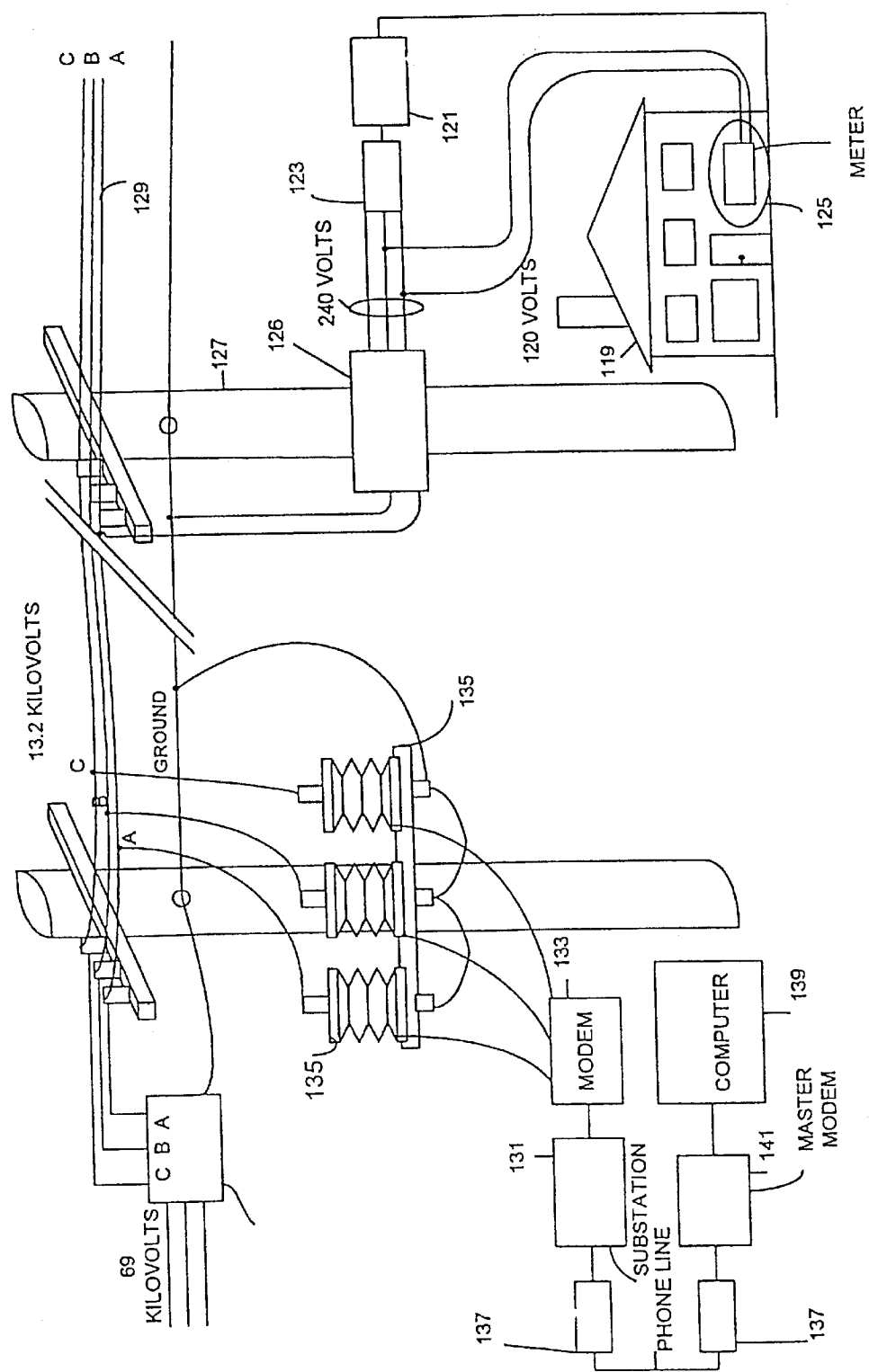
FIG. 22 is a schematic block diagram of an electric meter reading system incorporating the communication system of the present invention which may be implemented by a public utility.

Referring now to FIG. 22, the power line communication apparatus 10 may also be utilized for communication through power-line transformers, such as a distribution transformer 126. The coupler means 14, 22 permit communication through the transformers 126 at communication speeds of over 1200 baud. It is to be appreciated that for communication through the transformer 126 using FSK, PSK, ASK, FDM or spread spectrum using half-duplex with $F_1$ 32 30 Khz and $F_2$=31.6 Khz, using five 100 nanofarad (4.5 KVAC) capacitors connected serially with 6 megaohm, 5 watt resistors (up to 22 KV power-line), the bandwidth of the coupling means 14, 22 will cover the $F_1$ and $F_2$ frequencies.

Figure 9C:
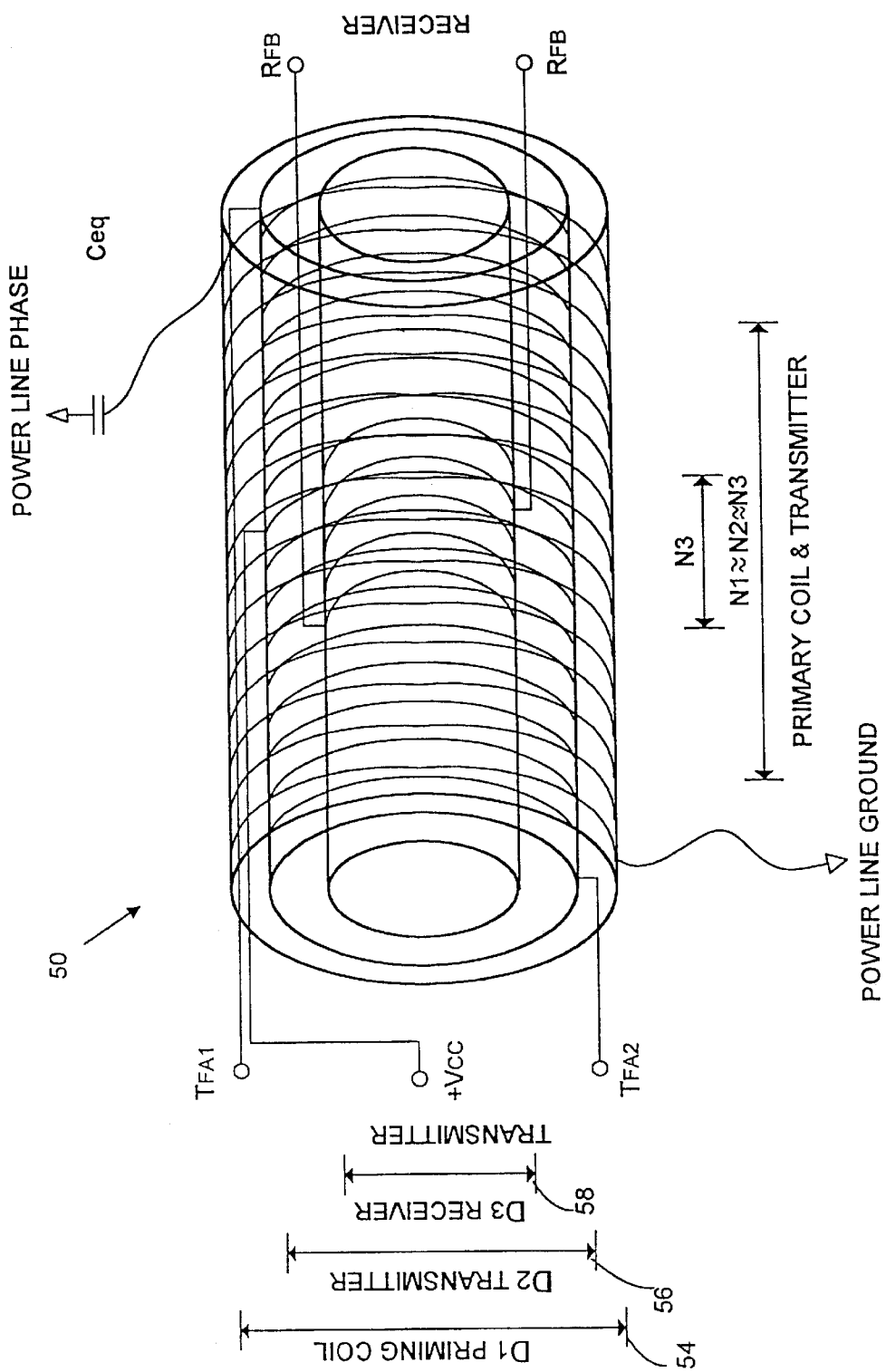
FIG. 9C illustrates a half duplexing coupler in accordance with the present invention for data communications through distribution transformers.

FIG. 9C illustrates an air core transformer 50 for a half-duplex coupler for data communication through the high voltage side of the distribution transformers 126. The air core transformer 50 preferably includes three solenoids (air-coils) having three different diameters. An outer coil 54 having a diameter of 6.0 cm, #26 gauge magnet wire, a middle coil 56 having a coil diameter of 4.8 cm, #20 gauge magnet wire and an inner coil 58 having a coil diameter of 4.2 cm, #22 gauge magnet wire. The largest diameter outer coil 54 is the primary winding which resonates with the capacitor; the middle coil 56 is the transmitter and/or receiver coil and the inner coil 58 is the receiver coil (if it is needed). For reception, the transmitter coil 56 must be uncoupled. In order to have transmission, the receiver coil 58 is uncoupled.

On the low power side of the power line distribution transformer 126 corresponding to the 120; 240 and 480 V power lines, the apparatus 10 can be configured to use the same carrier frequency, with one coupler on the low voltage side (i.e. a single primary and single secondary). The air core transformer 50 is coupled to at least one 66 nanofarad capacitor (500 VAC). In this situation, the primary coil 38 of the first air core transformer 36 has a diameter of 2.7 cm using #24 gauge magnet wire and the secondary coil 40 has a diameter of 2.2 cm using #26 gauge magnet wire. According to the present invention, the transmitter 16 and the receiver 18 do not contain a ferrite transformer. It is also possible that no receiver 18 will be needed. Theoretically, a data transmission rate of higher then 4800 baud can be achieved through power line transformers over long distances.

It is to be appreciated that the couplers of the present invention will permit more than one carrier frequency to be simultaneously transmitted through the same power line.

Figure 11:
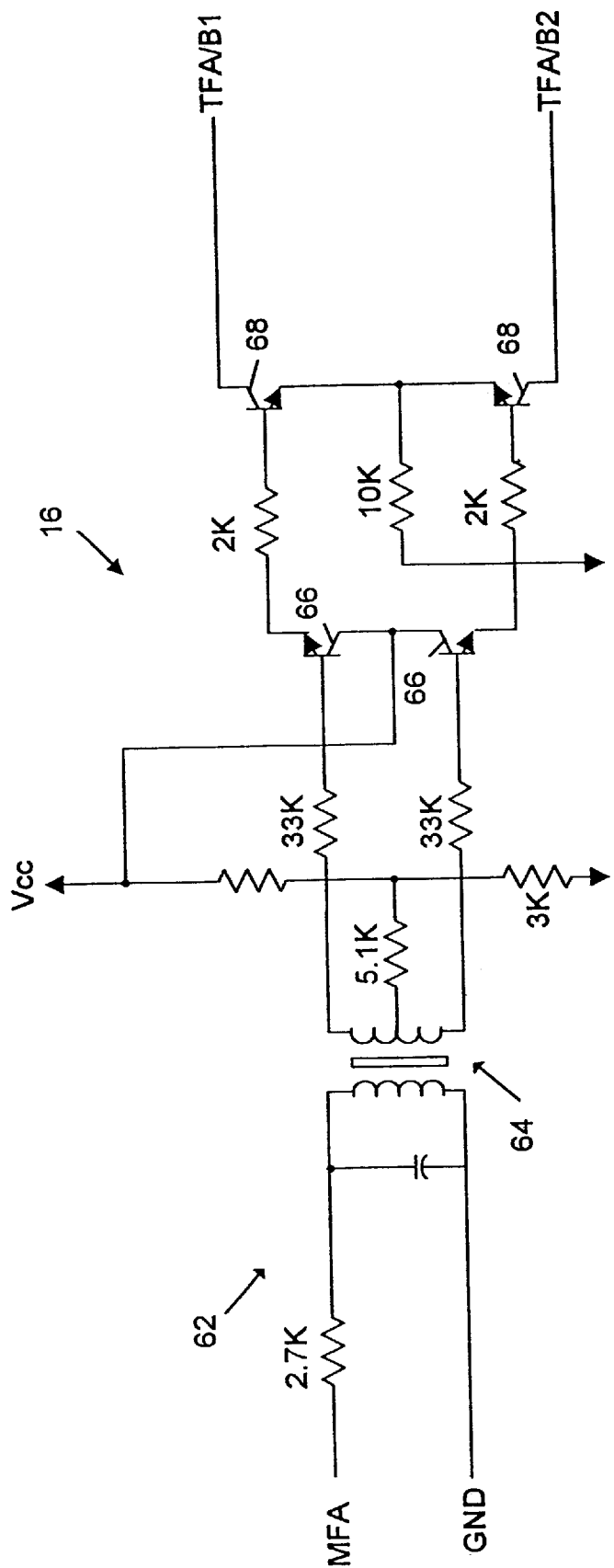
FIG. 11 is a schematic diagram of a transmitter in accordance with the present invention.

Referring now to FIG. 11, the preferred transmitter 16 useful in the power-line communication of data signals over long distances is shown. The transmitter 16 is utilized in all of the applications of the present invention, including transmission through the power line transformers 27. The transmitter 16 generally comprises a driver 62 which is connected to the coupling means 14, 22 by way of their respective connections TFA/B1, TFA/B2. The driver 62 comprises a magnetic coil 64 connected transistors 66, 68 and resistors and capacitors, as shown. The transistors 66 may comprise a conventional SK3444, while the transistors 68 may suitably comprise conventional SK3024. For higher power transmission, 2N3055 transistors may be utilized instead of SK3024. The particular value of each resistor and capacitor shown in FIG. 11 will depend upon the-specific operating characteristics of the driver 62, but such values are readily ascertainable without undue experimentation by one of ordinary skill in the art of electronics. Nevertheless, exemplary values of the resistors and capacitors are shown in FIG. 11. It is also understood that without a ferrite transformer, the transmitter 16 is able to transmit at a high communication speed. The second transmitter 24 is constructed similar to the first transmitter 16.

Figure 12:
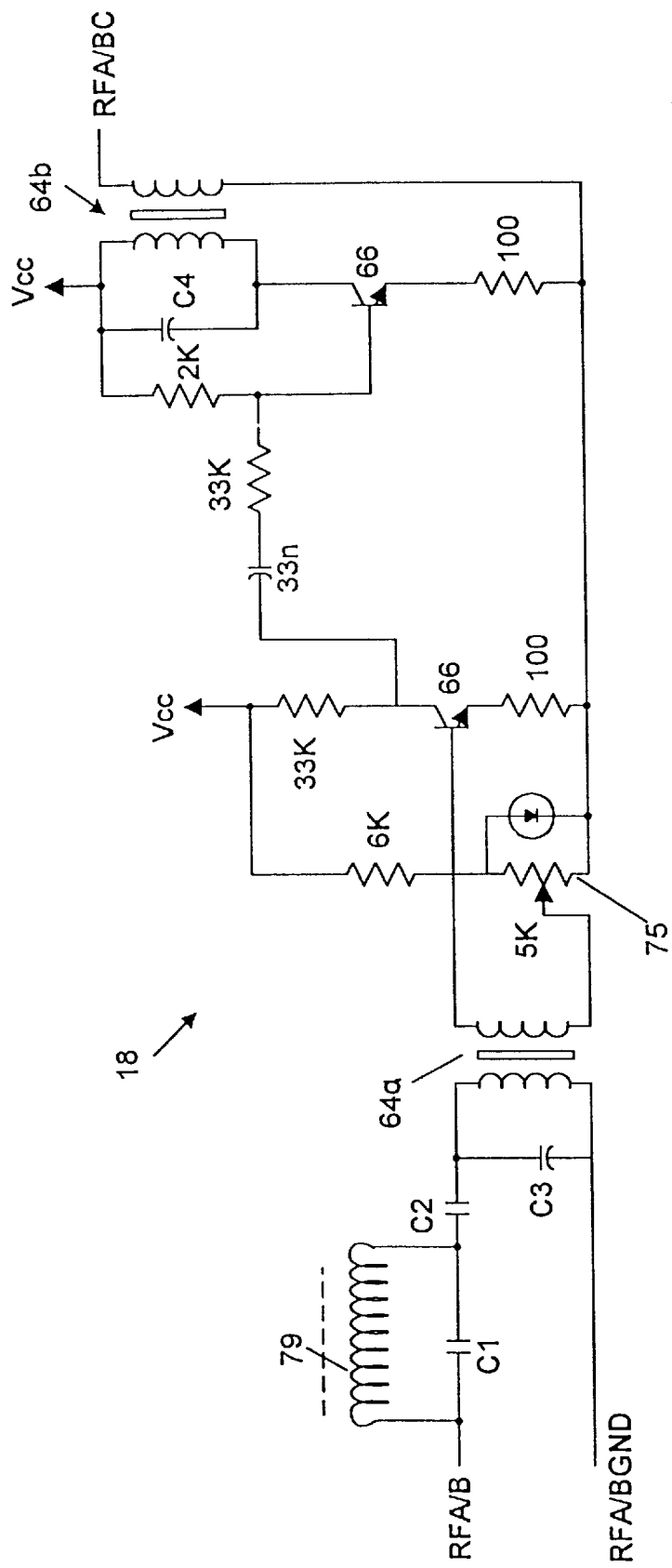
FIG. 12 is a schematic diagram of a receiver used in conjunction with the transmitter shown in FIG. 11, in the power-line communication of data signals over long distances.

Referring now to FIG. 12, a presently preferred embodiment of the receiver 18 of the present invention is shown. The receivers 18, 26 are connected to the respective coupling means 14, 22 by way of their respective connections RFA/B, RFA/BGND and RFA/BC. It will be readily apparent that the receiver 18, 26 is successful at attenuating out of band noise especially on high voltage power lines. The receiver 18 comprises transistors 66 connected to two magnetic coils 64 and a plurality of resistors and capacitors, as shown. Suitable transistors 66 comprise conventional SK3444. The particular value for each resistor and capacitor shown in FIG. 12 depends upon specific operating characteristics of the receiver 18, but such values are readily ascertainable without undue experimentation by one of ordinary skill in the art of electronics. Nevertheless, exemplary values of the resistors and capacitors are shown in FIG. 12. A key feature of the receiver 18 is the inclusion of a potentiometer 75 with which a bandpass filter receiver bandwidth-can be changed. The receiver 18 also includes a notch filter 79 coupled to one of the magnetic coils 64a (band pass filter) which filters out transmission frequencies on the same side of the transmission as the receiver 18. It will be appreciated that the receiver 26 is constructed in a manner similar to the receiver 18.

Figure 12A:
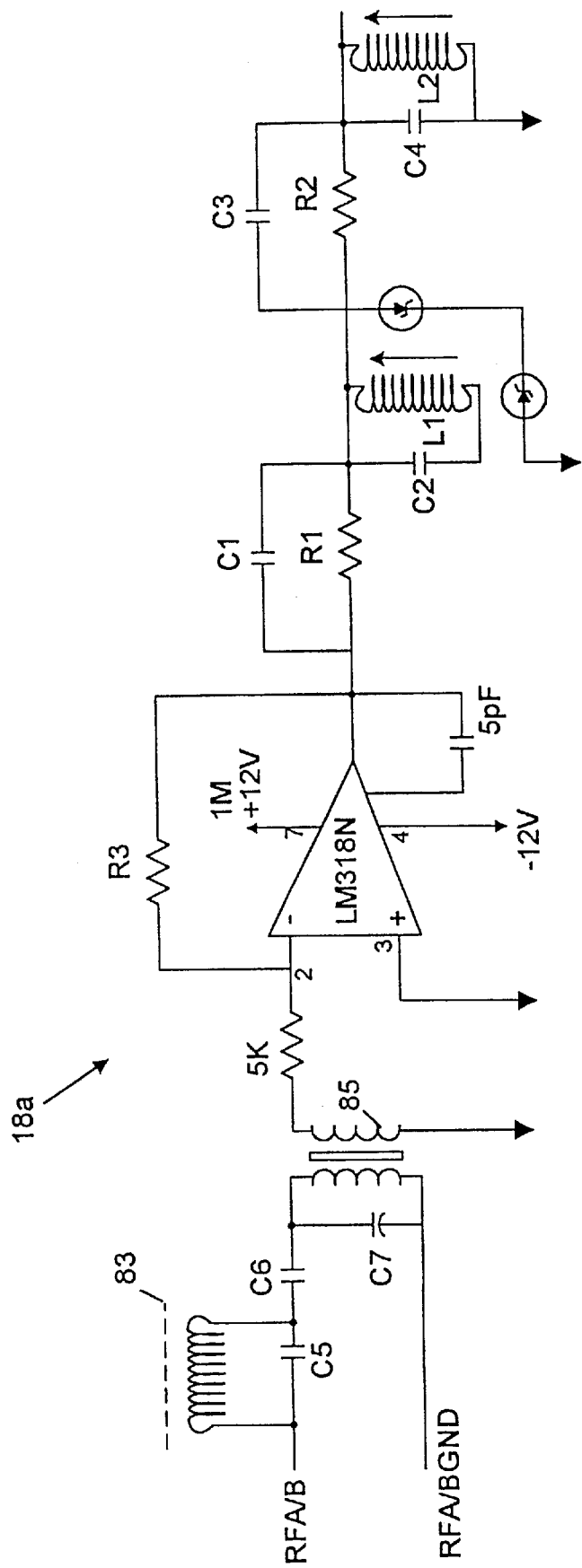
FIG. 12A is a schematic diagram of a receiver which can be used for high speed communications.

FIG. 12A shows an additional receiver 18a which can be utilized between 120V and 240V including FSK, and which is particularly suited for low voltage LAN communications. In the receiver 18a, $C_1$ and $R_1$ are used for F1; and $C_3$ and $R_2$ are used for F2 in a high pass configuration. In a low pass configuration, $C_2$ and $L_1$ are used for F1 and $C_4$ and $L_2$ are used for F2. The receiver 18a further utilizes a notch filter 83 coupled to a band pass filter 85 which filters out transmission frequencies. It is appreciated that by using no receiver or a modified receiver which does not contain a ferrite transformer the communication speed can be significantly increased.

Figure 10A:
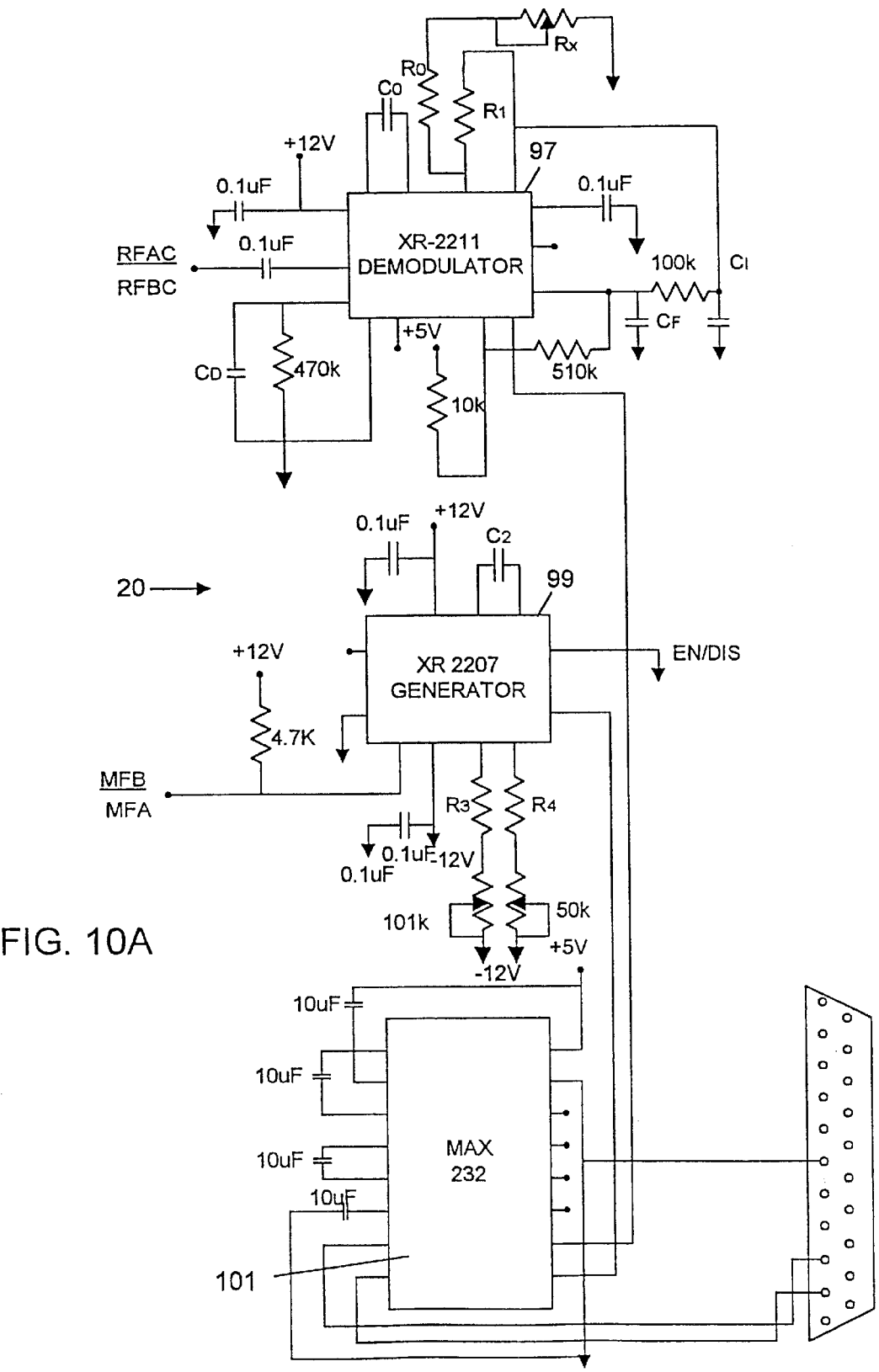
FIG. 10A is a schematic diagram corresponding to the modulator FA/demodulator FB shown in FIG. 6.

The modulation and demodulation of the data signals is now described with reference to FIGS. 10A and 10B. FIG. 10A illustrates the modulator/demodulator means 20. The modulator/demodulator 20 is preferably an FM modulator/demodulator circuit comprising an XR-2211 FSK demodulator 97, an XR-2207 FSK generator 99, and a MAX232 computer input/output interface 101 and associated resistors and capacitors, connected as shown. The values for $R_0$, $C_0$, $C_1$, $C_2$, $C_3$, and $C_4$ are utilized to alter the carrier frequencies (FA and FB). The values of $C_1$, $R_3$, and $R_4$ are varied to alter the FA and FB carrier frequencies. Representative values of the resistors and capacitors are provided in the drawing.

Figure 10B:
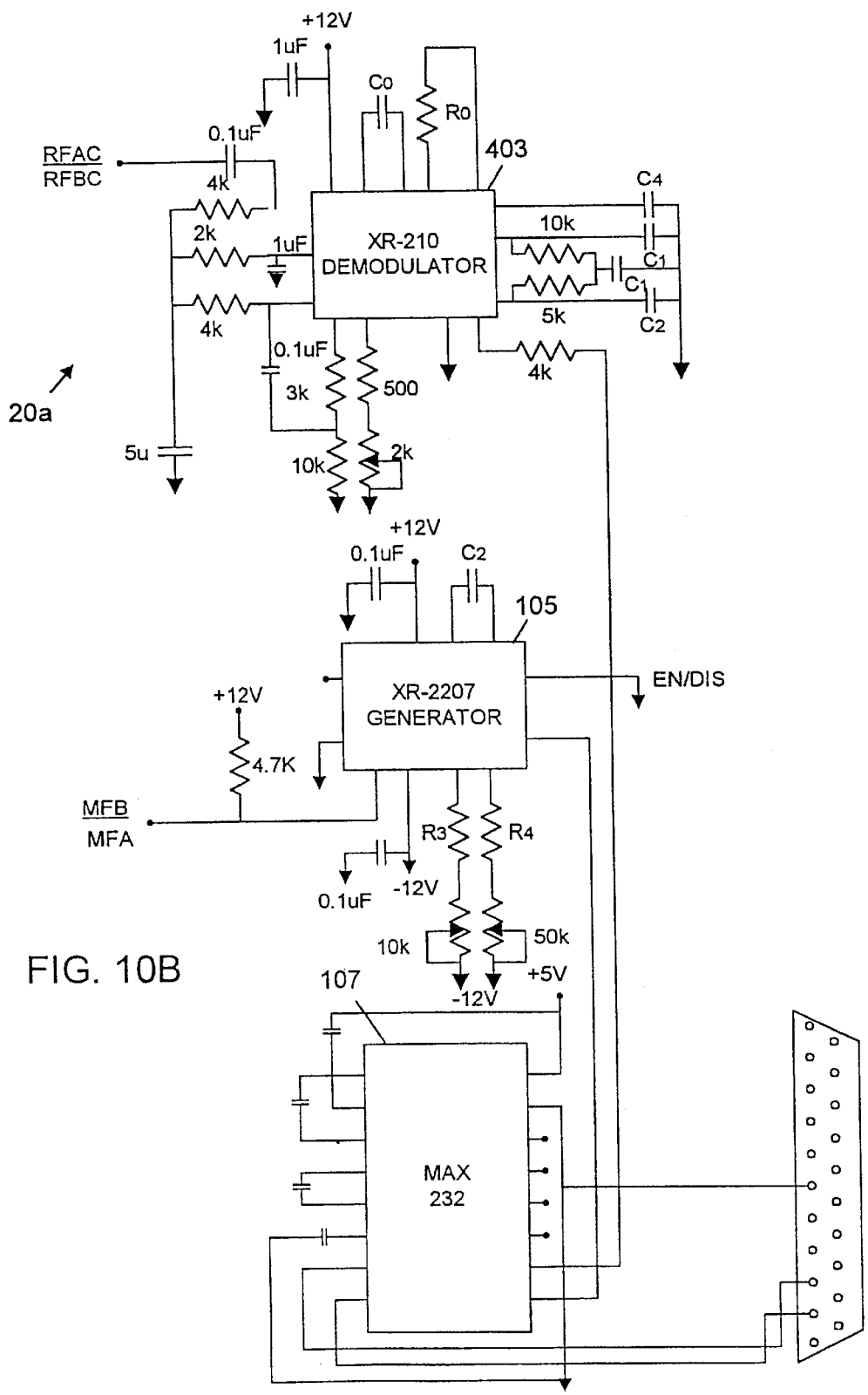
FIG. 10B is a schematic diagram of an alternative modulator FA/demodulator FB for the system in FIG. 6.

FIG. 10B illustrates an alternative FM modulator and demodulator (modem) 20a which is preferred for high frequency communication for LAN and phone line communication. The modem 20a comprises a XR-210 FSK demodulator 103, an XR-2207 FSK generator 105 and a MAX232 computer input/output interface 107, along with associated resistors and capacitors. The values for $R_0$, $C_0$, $c_1$, $C_2$, $C_3$, and $C_4$ are utilized to alter the carrier frequencies (FA and FB) and the values of $C_1$, $R_3$ and $R_4$ are varied to alter the FA and FB carrier frequencies.

Figure 10C:
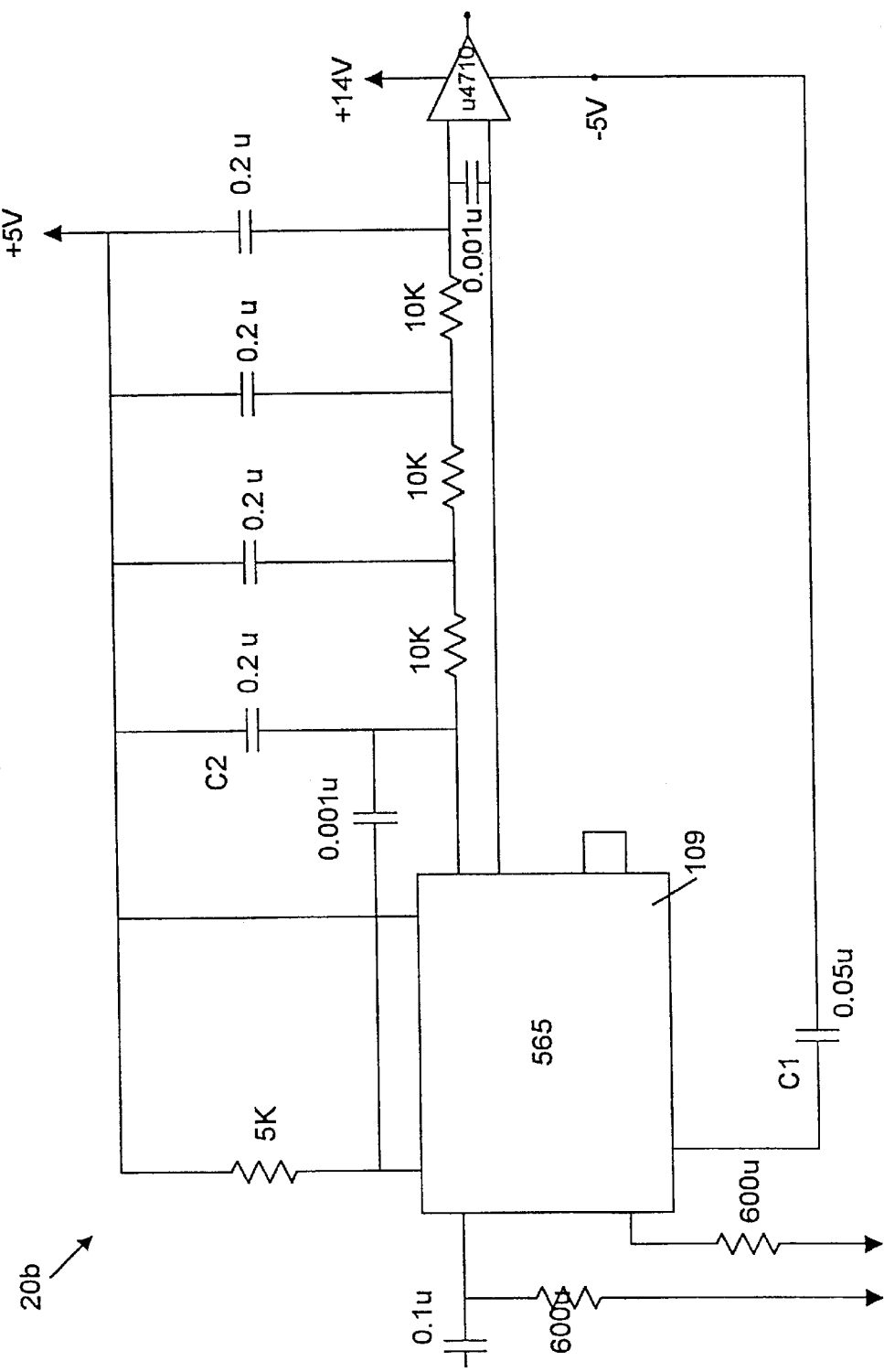
FIG. 10C is a schematic diagram of an FSK decoder phase lock loop which can function as the modulator/demodulator circuit of FIG. 6.
Figure 10D:
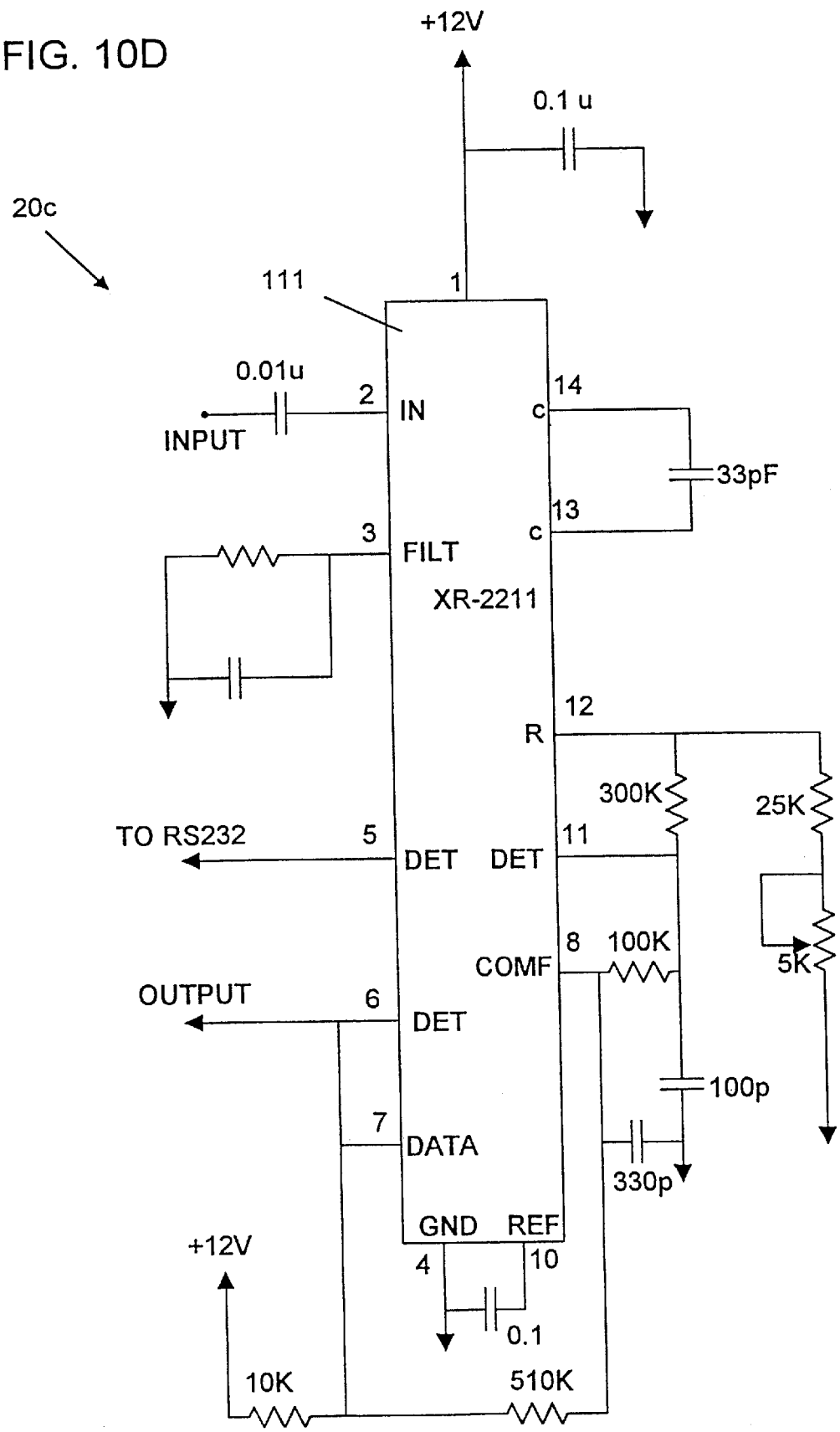
FIG. 10D is a schematic diagram of a primary phase lock loop of FIG. 10A.

FIGS. 10C and 10D illustrate additional modulator/demodulator circuits 20b, 20c which can be utilized in the present invention. FIG. 10C shows an FSK decoder using a 565 interface 109. A loop filter capacitor is chosen to set the proper overshoot on the output and a three-stage RC ladder filter is used to remove the noise frequency component. As shown in FIG. 10D, another FSK chip, an XR2211 chip 111, can be used to demodulate and an XR2207 (not shown) can be used for modulation.

Figure 10E:
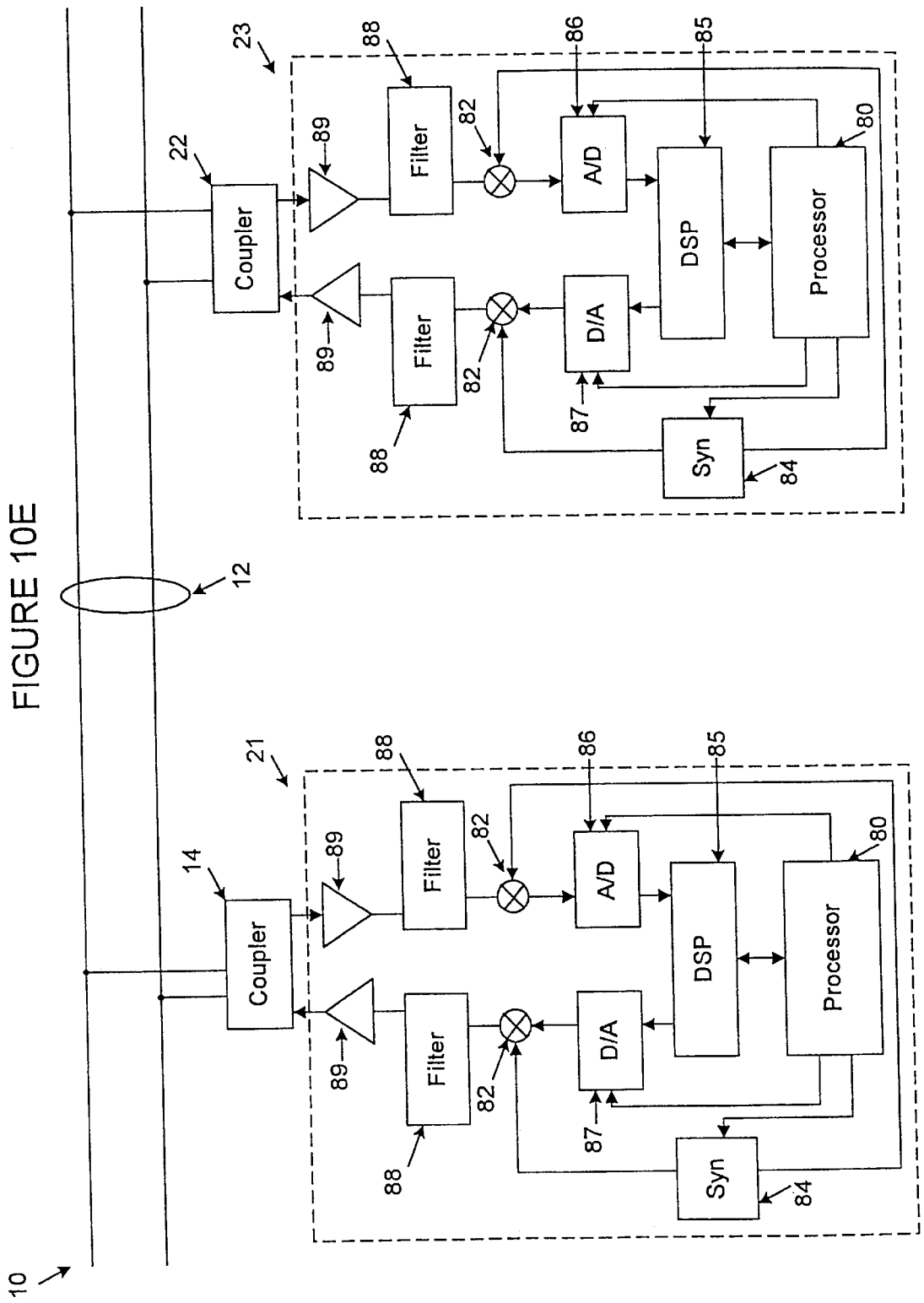
FIG. 10E is a schematic block diagram of an FM power line communications system according to the present invention.

Practically speaking, the stability of air-core couplers is improved by placing the primary and secondary coils into plastic or resin. However, even then, the, stability of the frequency characteristic response of the couplers measured over the power line can vary by a couple of percent in different locations. In order to assure the same high speed communication in every outlet (in an AC wiring scheme), according to the present invention, the carrier frequency is movable. Dynamically moving the carrier frequency allows the widest linear response to the couplers to be determined and selected. Referring now to FIG. 10E, the power line communication apparatus 10 for transmitting data over the power or electrical lines 12 comprises first and second couplers 14, 22 connected between the power lines 12 and respective modems 2i, 23. In order to move the carrier frequency of the signal transmitted over the power line 12, the modems 21, 23 include a processor 80, a mixer 82, a synthesizer 84, a digital signal processor (DSP) 85, an A/D converter 86, a D/A converter 87, filters 88 and amplifiers 89. Although it is presently preferred to use the DSP 85, the logical functions performed by the DSP 85 could also be implemented using other means, such as a Field Programmable Gate Array (FPGA). The synthesizer 84 may comprise the local oscillator of the mixer 82 and the local oscillator frequency can be varied. For example, using Phase Shift Keying (PSK), such as QPSK, or 16 QAM, the carrier frequency can be varied every 500 KHz from about 18 Mhz to about 25 Mhz in order to achieve transmission speeds of about 10 Mbps. The first and second modems 21, 23 perform a handshaking procedure to determine the carrier frequency which will be used for data transmission. That is, the first or transmitting modem 21 transmits the carrier frequencies in sequence before actual data transmission begins. The second or destination modem 23 knows the actual sequence and receives some of the transmitted carrier frequencies depending on the best phase linearity of the power line 12 and the power line outlets (not shown) and on interference. The second modem 23 then transmits back to the first modem 21 information concerning the frequency with the least interference or noise (i.e. the best transmission frequency for the given power line 12), thereby informing the first modem 21 of the selected carrier frequency. The modems 21, 23 then communicate at the selected carrier frequency. In the case where no data is being received, the carrier frequency selection sequence is reinitiated. In this manner, the best linear response of the couplers 14, 22 is determined and interference is avoided. As will be understood by those of ordinary skill in the art, Amplitude Shift Keying (ASK), Frequency Shift Keying (FSK), Phase Shift Keying (PSK), Time Shift Keying (TSK), spread spectrum or any other suitable modulation technique can be used.

Figure 18:
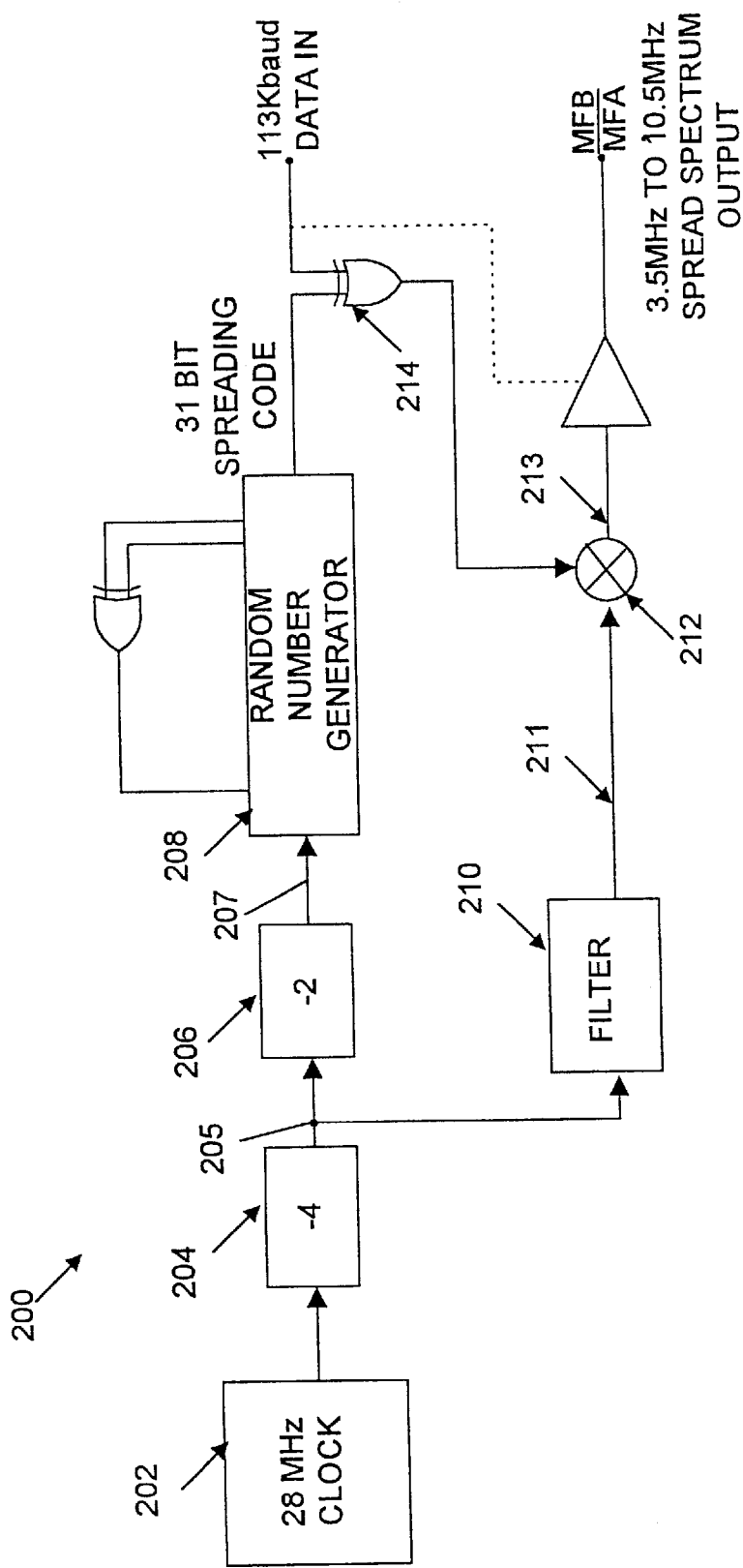
FIG. 18 is a schematic block diagram of a spread spectrum transmitter/receiver in accordance with the present invention.
Figure 19:
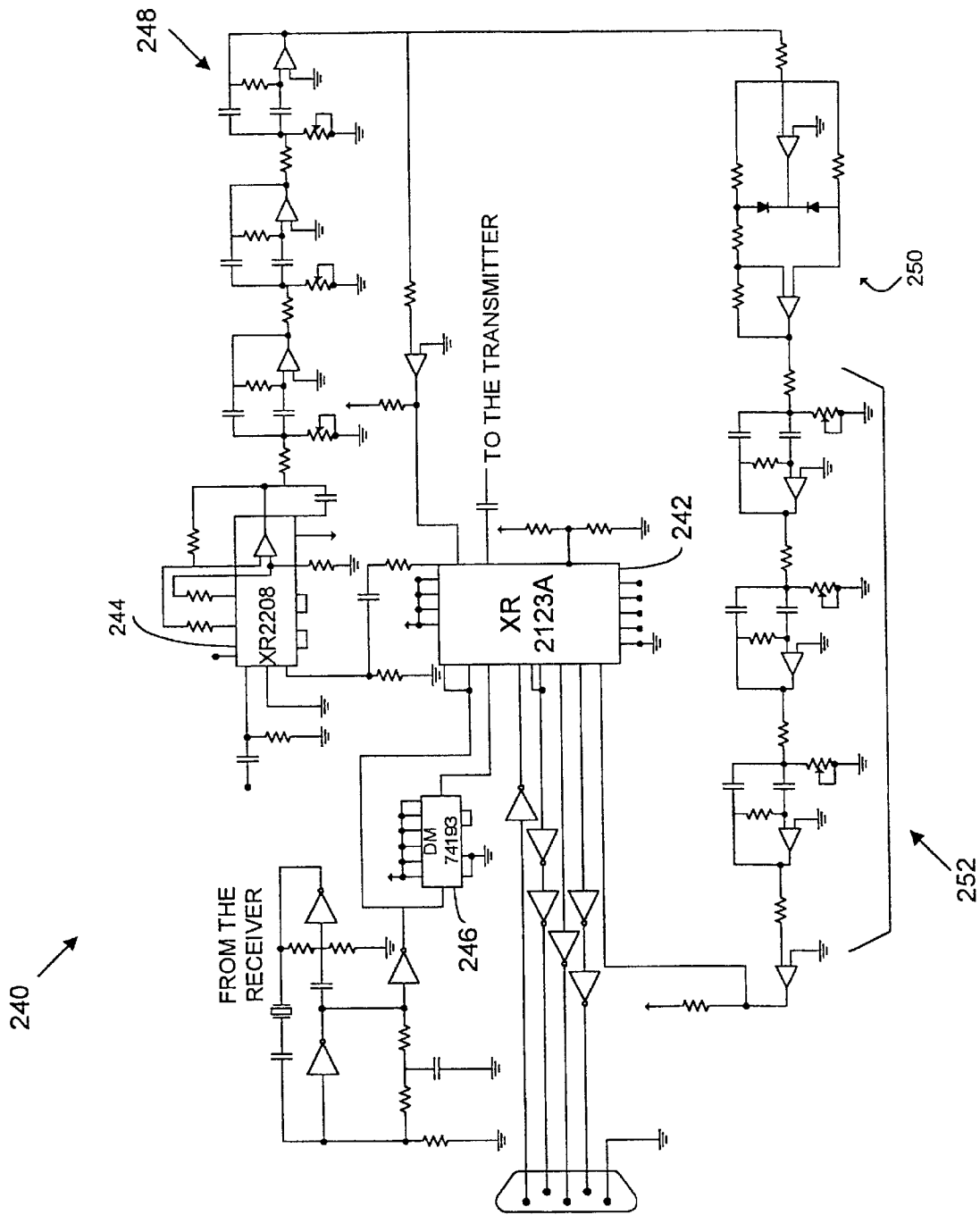
FIG. 19 is a schematic diagram of a phase shift keying modulator/demodulator which can be utilized with the present invention.

Referring now to FIGS. 18 and 19, two complete modem configurations which can be utilized in the present invention for the first and second modulators/demodulators 20, 28 are shown. FIG. 18 is a schematic block diagram of a spread spectrum transmission and receiver modem 200. As is known by those of ordinary skill in the art, the spread spectrum modem 200 includes a clock 202, clock divider circuits 204, 206, a random number generator 208, a filter 210 and a balanced modulator 212. The first clock divider 204 receives a 28 MHz clock signal from the clock 202 and divides the clock signal by four, generating a 7 MHz signal 205. The 7 MHz signal 205 is output from the first clock divider 204 and transmitted to the second clock divider 206 and to the filter 210. The second clock divider 206 divides the 7 MHz signal 205 by two, producing a 3.5 MHz signal 207, which is provided to the random number generator 208. The output of the random number generator 208 is gated with the data to be transmitted with a logic gate 214 and provided to the modulator 212. The filter 210 produces a 7 MHz sine wave signal 211 which is also provided to the modulator 212, which produces a spread spectrum output signal 213.

The spread spectrum modem 200 transmits several different modulated carrier frequencies separately or simultaneously. The modulation technique can include ASK, FSK, PSK or TSK. Normally, seven ASK modulated carrier frequencies are transmitted separately in a sequence. This technology assumes that at least four modulated carrier frequencies out of seven will contain the same information, which will be the correct information.

Figure 18A:
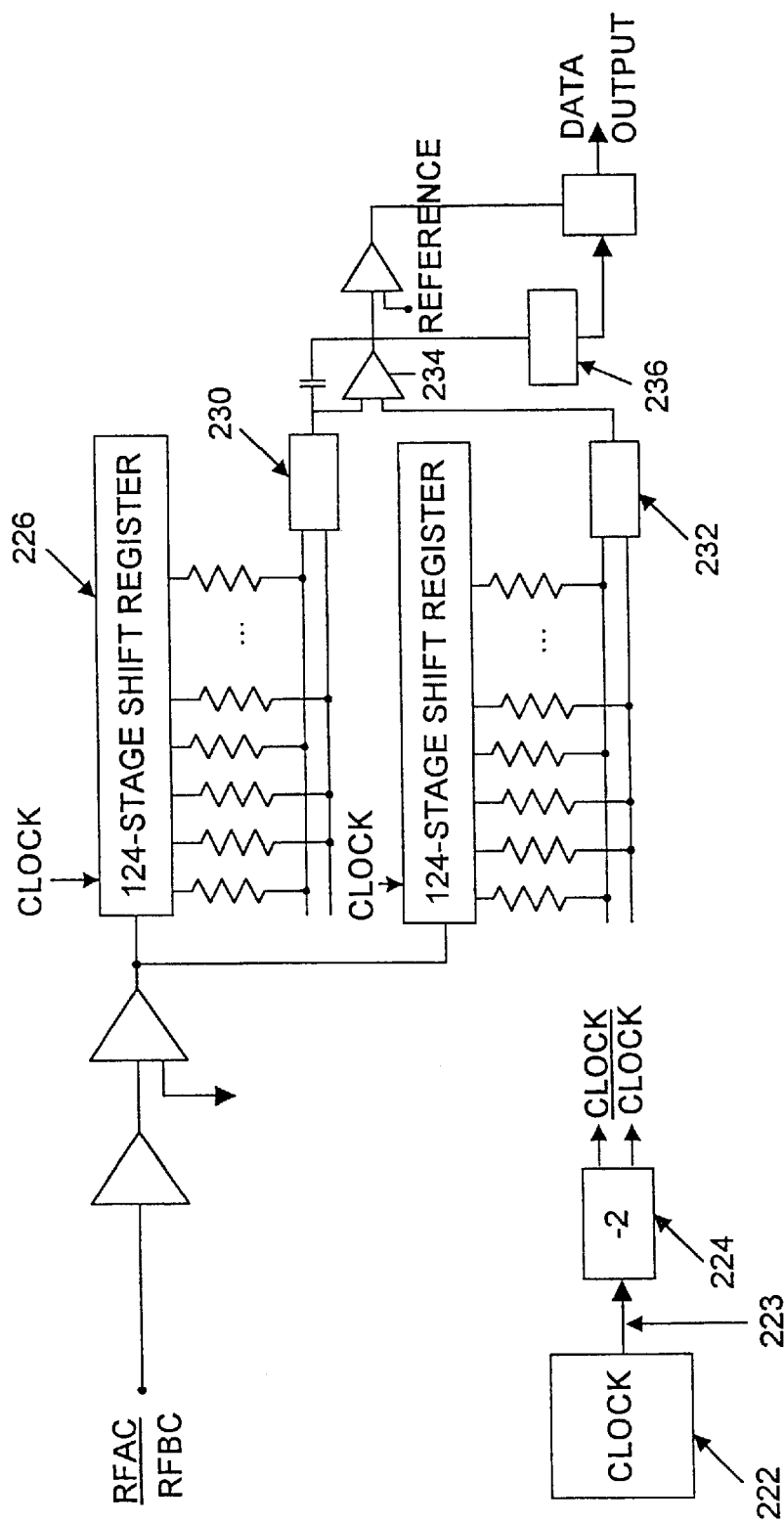
FIG. 18A is a block diagram of a power line spread spectrum receiver.

FIG. 18A is a schematic block diagram of a power line spread spectrum receiver 220 which includes a clock 222 like the clock 202 for generating a 28 MHz clock signal 223, a clock divider 224 for dividing the clock signal 223 by 2 to produce both complements of a 14 MHz clock signal, a pair of shift registers 226, 228 and respective multipliers 230, 232, an integrator 234 and a flywheel circuit 236. The receiver 220 is conventional. Such receivers are understood by those of ordinary skill in the art and accordingly, a detailed description of the receiver 220 is not required for a complete understanding of the present invention. Moreover, although the present invention may be implemented using spread spectrum technology, spread spectrum modulation is not preferred due to a number of drawbacks presently associated with such technology. For instance, as opposed to other modulation techniques, the bandwidth required is too, large, it is sensitive to interference, and is regulated by the government for emission testing above 1.7 Mhz carrier frequency.

FIG. 19 illustrates a phase shift keying (PSK) transceiver modem circuit 240 particularly applicable for phone line and LAN communications. The PSK modem circuit 240 includes an XR 2123 modulator/demodulator 242, an XR2208 Operation Multiplier 244, a DM74193 synchronous up/down counter 246, a carrier filter circuit 248, a full wave rectifier circuit 250, and a 1200 Hz baud filter circuit 252. The modem circuit 240 essentially comprises an analog PSK modulation modem for telephone applications. The PSK modem circuit 240 requires a smaller bandwidth for communication than an FSK modem because it uses only one carrier frequency while changing sine and cosine waves. The PSK technique is preferred for the present invention because the present invention has very good phase linearity within the pre-selected band and a higher order phase shift keying technique (QPSK, 16 QAM) needs smaller bandwidth than a FSK or ASK technique. On the other hand, the difficulties with this technique, as compared to FSK, are the synchronization of the receiver and the need for a higher signal to noise ratio. Nevertheless, the PSK modulation technique is the most preferred technique for practicing the present invention.

OPERATIONAL EXAMPLE

The particular attributes of the power line communication apparatus 10 are illustrated in view of the following comprehensive example described with reference to FIGS. 22–25. The example utilizes most of the coupler configurations and modems discussed above and illustrates how the communications apparatus 10 is utilized in a comprehensive system using LAN, phone line, high voltage and low voltage power line communications, as well as communication through power line transformers.

FIG. 22 illustrates an example of the couplers of the present invention as they may be utilized by an electric power public utility for reading home power meters. In this example, each house 119 receiving electric power from utility would have a modem 121 and air coil transmitter and receiver coupler circuit 123 in accordance with the present invention coupled to the electricity meter 125. The coupler 23 connects to the 240 low voltage distribution transformer 126, via low voltage lines, situated on a utility pole 127 located adjacent to the house 119. The couplers 23 have the low voltage configuration which is capable of communicating through power line transformers as discussed above. The system utilizes the transmitters, receivers, modulators/demodulators, or modem circuits disclosed in FIGS. 10A, 11 and 12. The distribution transformer 126 is connected to one of the three 13.2 KV power lines 129 on the utility pole 127.

At the other end of the system situated at a local substation 131, a second substation modem 133 is connected to one of three couplers 135 in accordance with the present invention. The couplers 135 are preferably encased in resin or a polymeric material, as disclosed above, and preferably have the high voltage side transformer configuration of FIG. 9C. The substation 133 is connected via a coupler 137 to a central computer 139 of the utility (such as a VAX computer) via phone lines. The substation 131 and the computer 139 communicate over the power or phone line at rates up to 10 Kbaud as set forth herein using the high speed couplers and appropriate high speed modems.

When the utility desires to read a meter, the computer 139 issues an addressable command which is transmitted via a master modem 141 and the coupler 137 to the particular substation at speeds up to 10 Kbaud over the power or phone lines 138. The substation then transmits an addressable command to a particular meter via the modem and the couplers. The command is transmitted over the 13.2 KV line at speeds up to 1200 baud, through the distribution transformer, the home couplers 123 and the modem 121. A meter reading is recorded, transmitted by the home modem 121 through the couplers 123, through the distribution transformer 126, over the 13.2 KV power line 129 to the appropriate substation coupler 135, and to the substation modem 133. The system only requires between one and ten watts for power transmission in both directions.

Figure 22A:
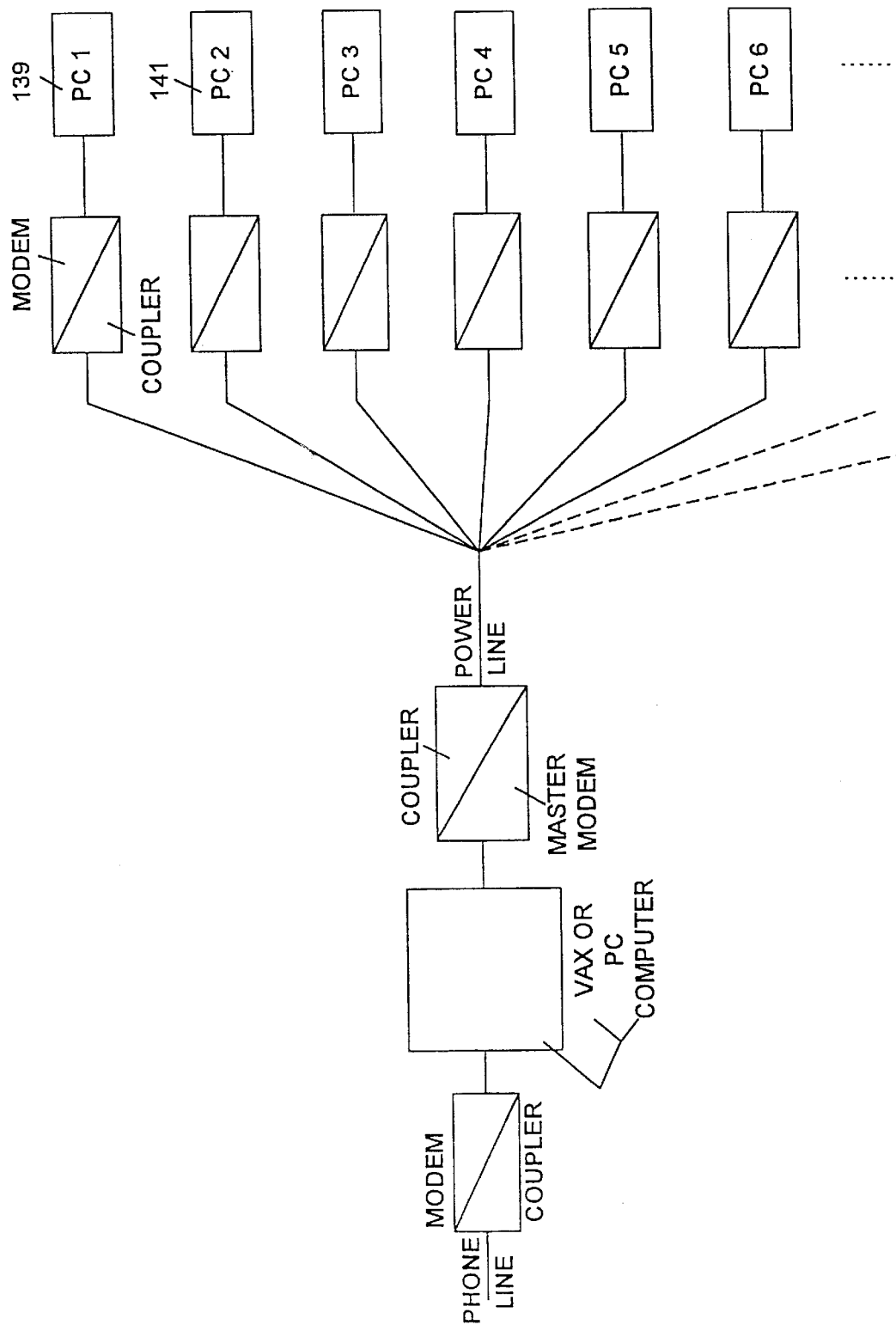
FIG. 22A is a block diagram illustrating the use of the couplers of the present invention within a LAN linked by power lines or conventional phone lines.

From the substation, the meter reading may be transmitted via conventional phone lines 138 to the computer 139. Additionally, as shown in FIG. 22A, the high speed LAN couplers of the present invention could be used within the utility to connect local workstations to the computer 139. For example, a clerical worker situated at a workstation may access the computer 139 through the power lines of the facility via modems and high speed LAN or phone line couplers.

Figure 23:
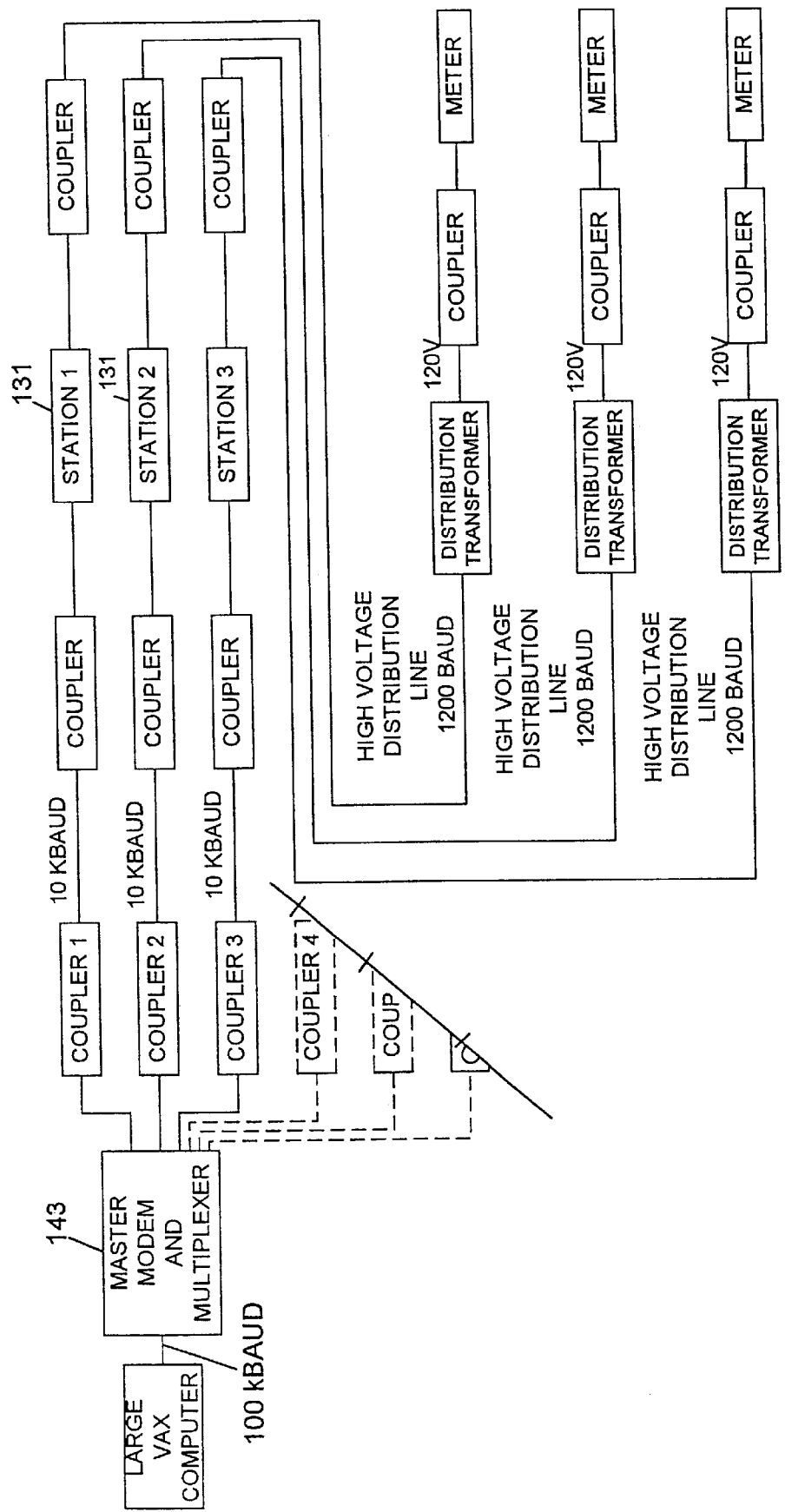
FIG. 23 is a block diagram of the system of FIG. 22 as applied to a multiplicity of substations.

FIG. 23 is a block diagram of an expanded system which may be utilized by a public utility to meter a multiplicity of substations. In this embodiment the computer 139 simultaneously reads a large number of meters via a master modem and multiplexer coupled to a multiplicity of couplers 143. As shown, the computer 139 communicates with each substation (1, 2, 3, etc.) over conventional phone lines. The respective substations then communicate with the individual meters at 1200 baud via the high voltage distribution line and through the distribution transformers.

Figure 24:
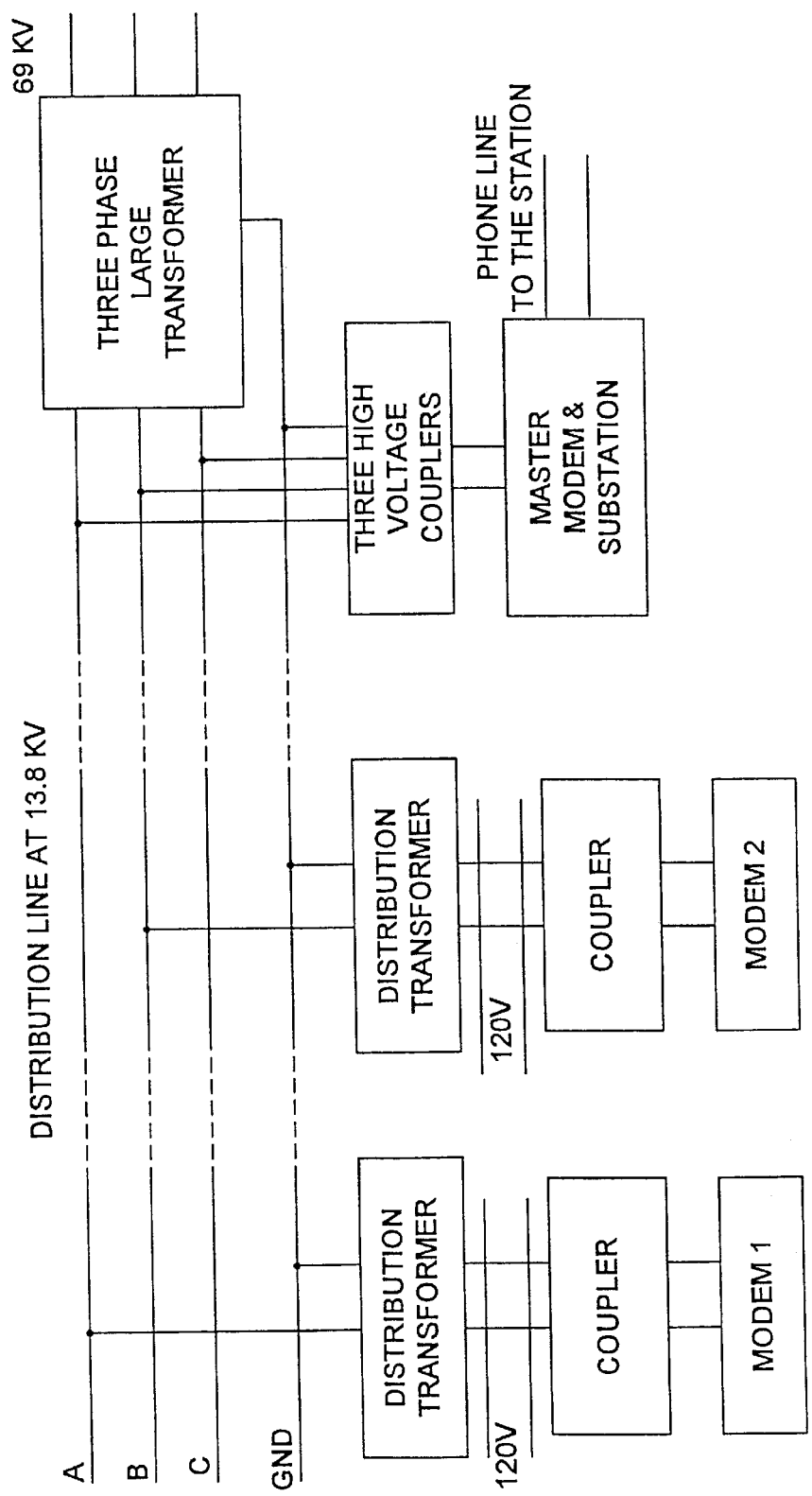
FIG. 24 is a simplified block diagram of the system of FIG. 22.
Figure 25:
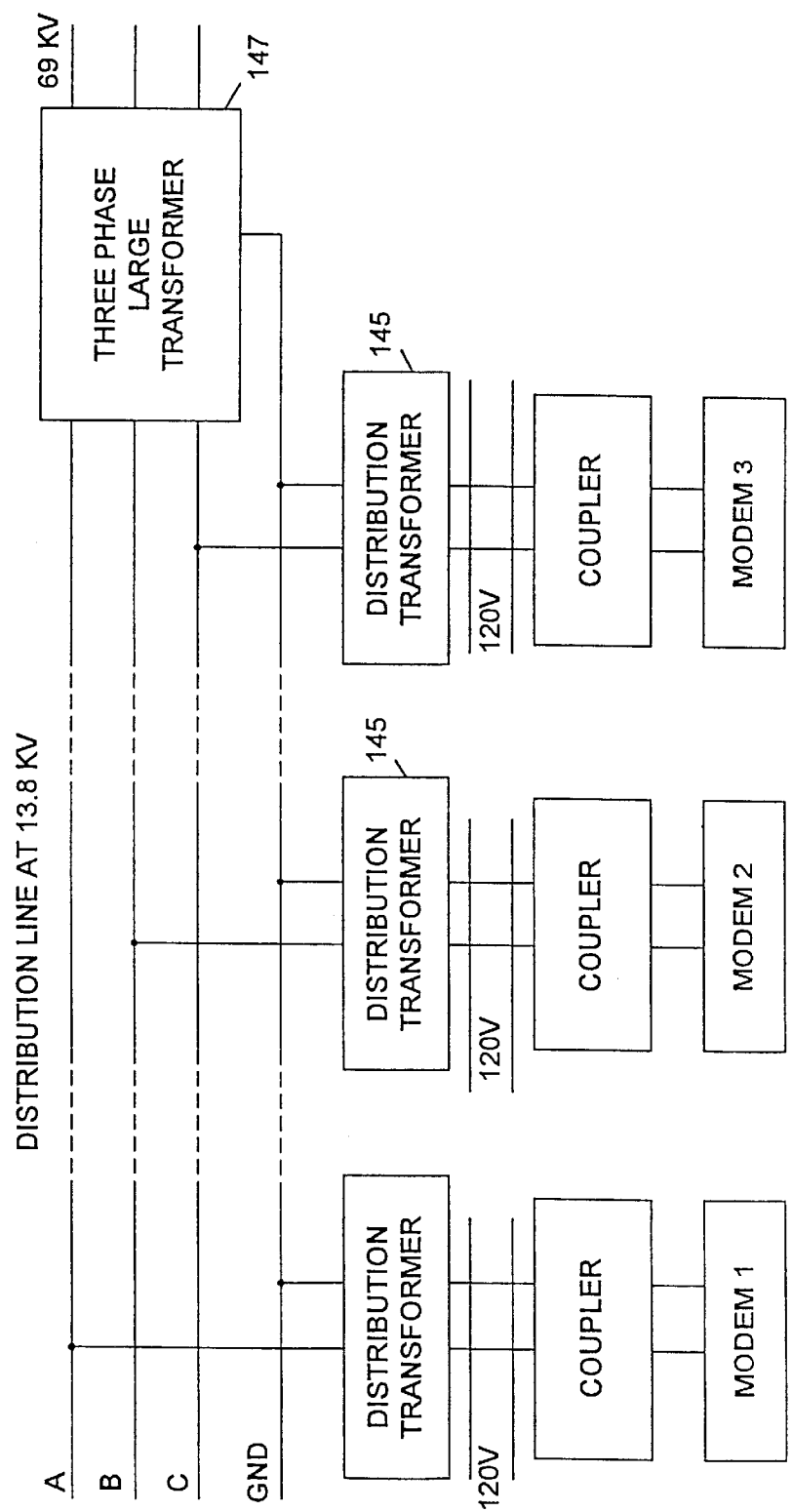
FIG. 25 is a block diagram of a power line communication system.
Figure 26:
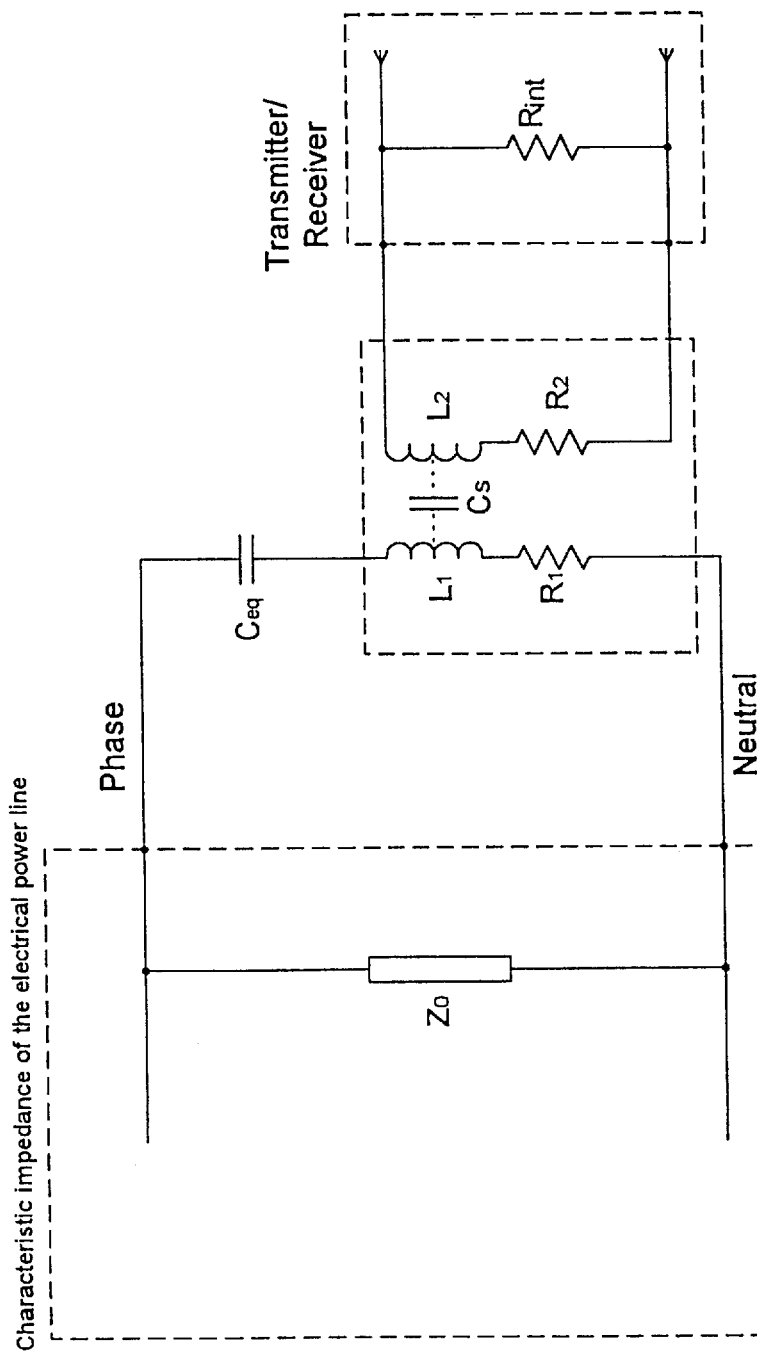
FIG. 26 is a schematic circuit diagram-of an equivalent electrical circuit of the communications apparatus of the present invention electrically connected to an electrical line.

FIG. 24 is a simplified block diagram of the communication system of FIG. 22. FIG. 25 is a block diagram of how the couplers of the present invention can be utilized to communicate through two power line transformers 145 and through a three phase large transformer 147. In this configuration, the couplers comprise low voltage couplers designed for communication through power line transformers as discussed above. It is to be noted that the couplers of the present invention permit simultaneous transmission and reception of more than one carrier frequency through the couplers. Hence, the couplers can be simultaneously utilized by an electric public utility for electric meter reading at a first frequency while a public water utility utilizes the couplers at a second carrier frequency for water meter reading.

A final consideration of the present invention is the connection of the apparatus to a three phase power line. FIG. 13 illustrates the general case of coupling the apparatus 10 to the power line, phase to ground. In this format, the carrier frequency is undetectable by other phase-ground coupling connections and each phase is isolated from each other for communication purposes.

Figure 14:
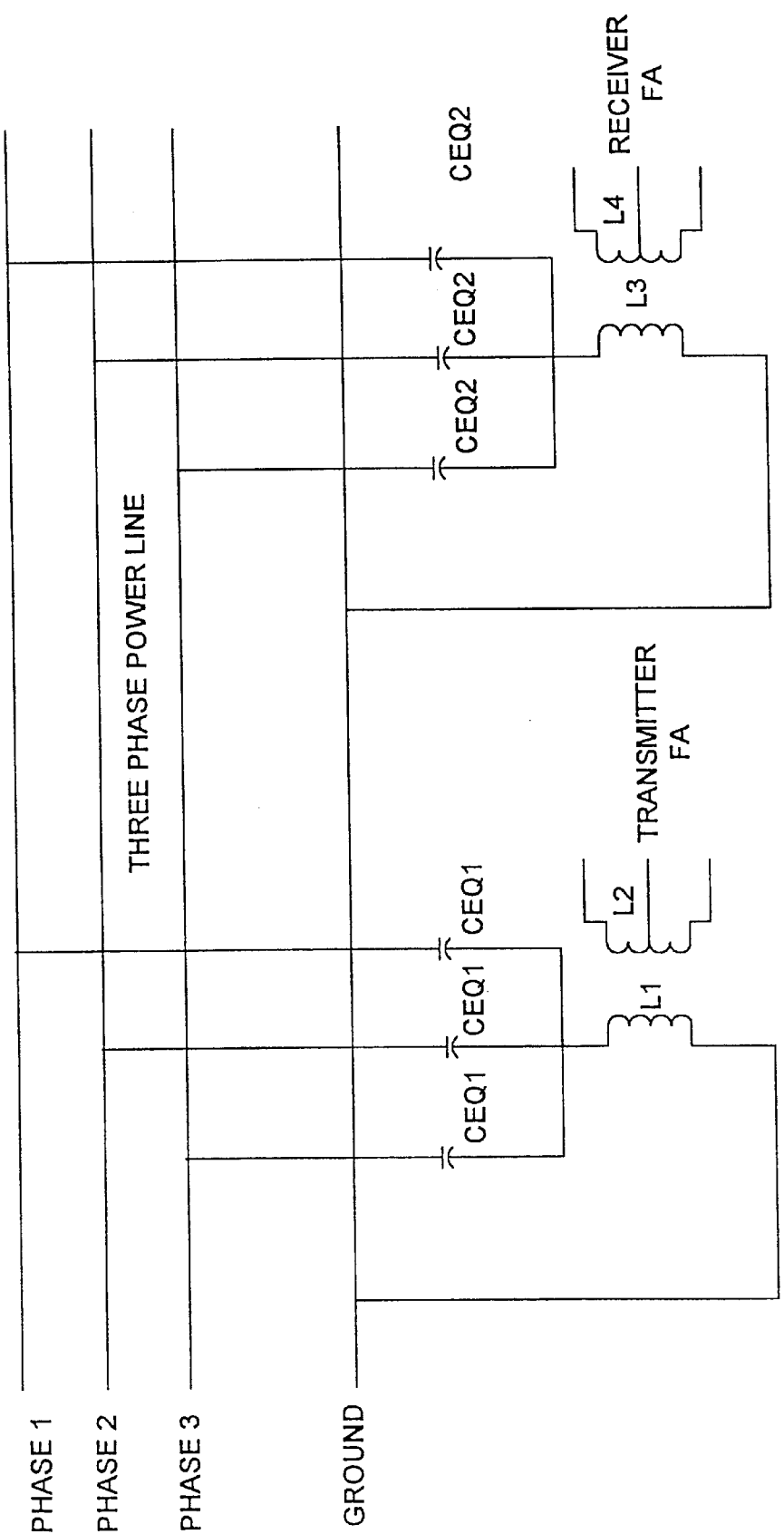
FIG. 14 is a schematic diagram of a three phase coupling to the power line, three phases to ground.

FIG. 14 illustrates a special three phase coupling connection to the power line, 3 phases to ground. This system utilizes all three phases from the power line and ground for communication. In this case, the carrier frequency is detectable on any phase-ground coupling connection. In this manner, the phases are interconnected for communicating purposes.

Figure 15:
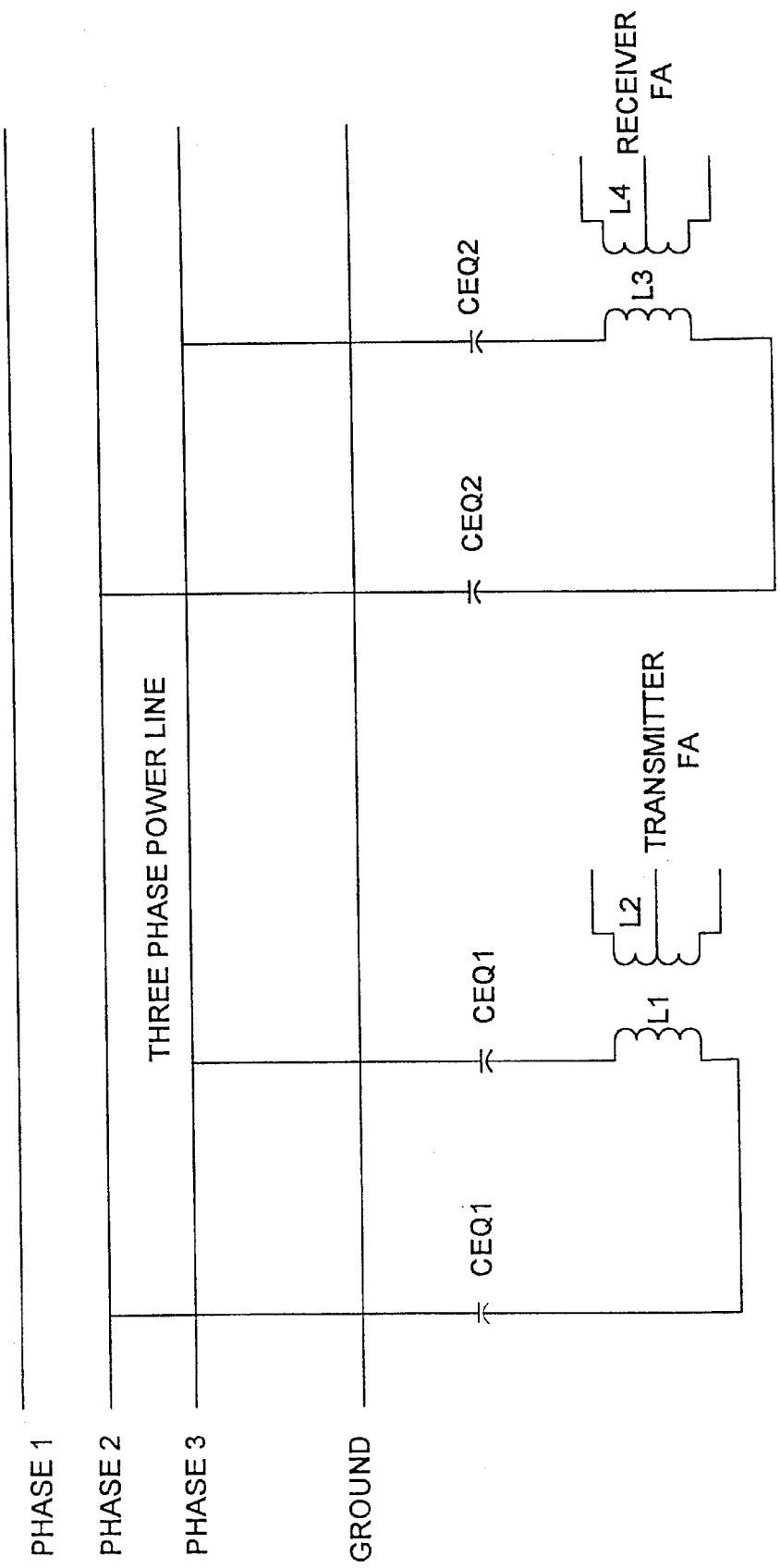
FIG. 15 is a schematic diagram of a two phase coupling connection to the power line, phase to phase.

FIG. 15 illustrates a special two phase coupling. connection to the power line, phase to phase 147. This system utilizes two phases from the power line for communication. The carrier frequency is detectable only on the two phase coupling connection. In this configuration, only the coupled two phases are connected from communication purposes.

Figure 16:
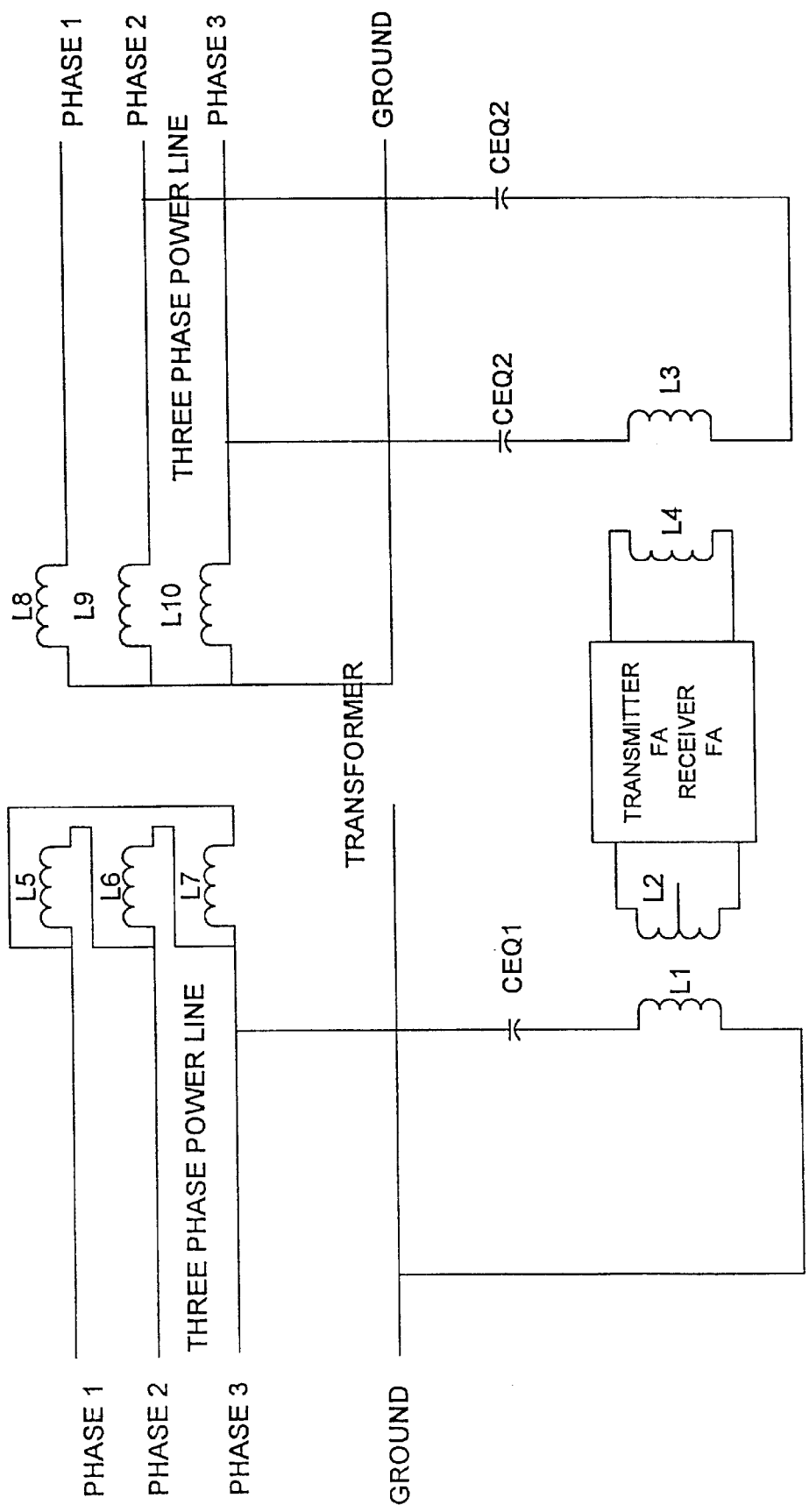
FIG. 16 is a schematic diagram of a three phase transformer coupling of the type predominantly used in Europe.

FIG. 16 illustrates a three phase transformer coupling around delta and Y (Wye) transformers 149. This coupling system is generally utilized in Europe. The carrier frequency is detectable on the other power line. In this manner, two different high voltage power lines are connected to each other for communication purposes.

Figure 17:
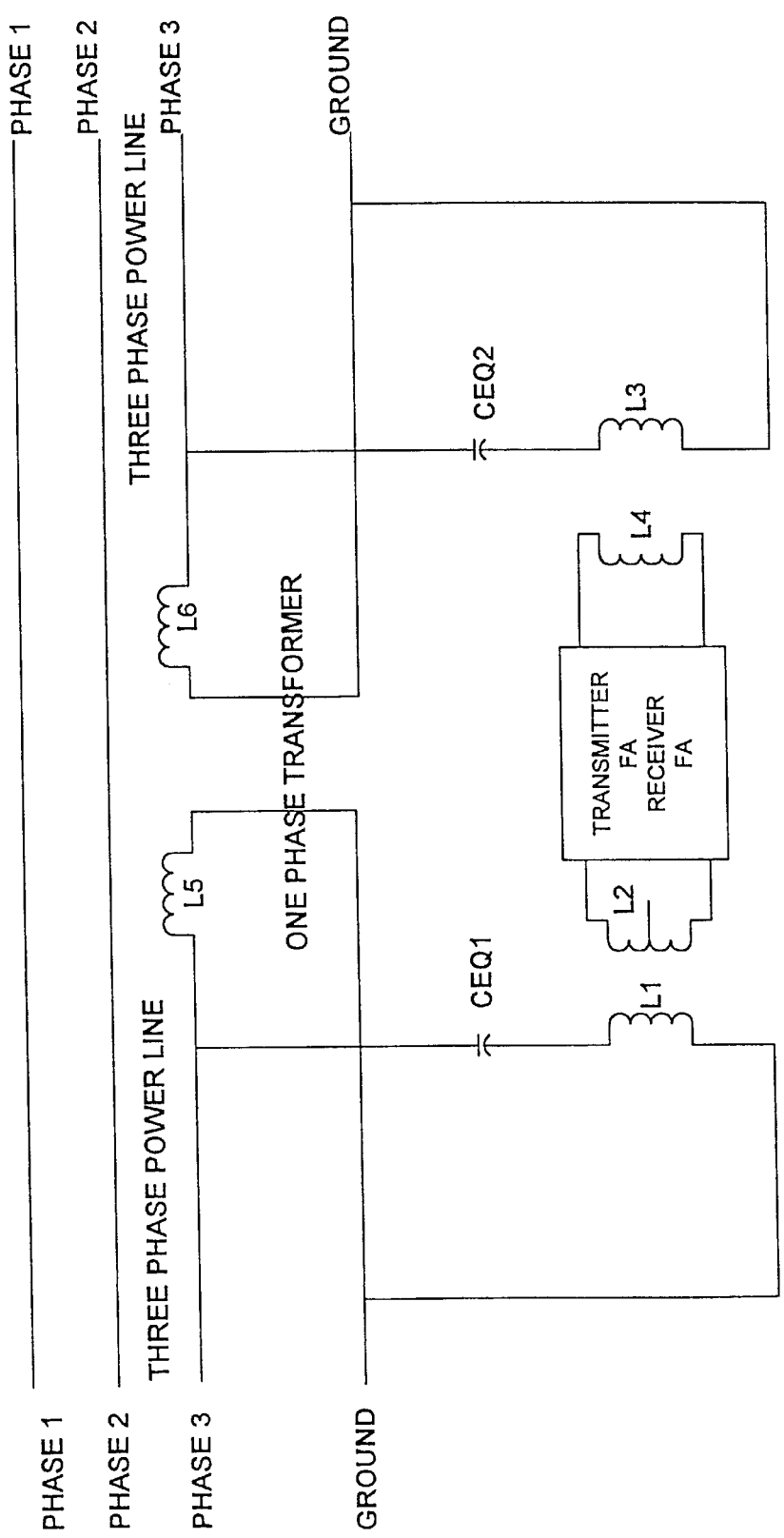
FIG. 17 is a schematic diagram of a one phase transformer coupling of the type generally used in the United States.

FIG. 17 illustrates a one phase transformer coupling which is generally used in the United States. The carrier frequency is detectable on the other power line. Accordingly, two different high voltage power lines are connected to each other for communication purposes.

It will be appreciated by those skilled in the art that changes could be made to the embodiments described above without departing from the broad inventive concept thereof. It is to be understood, therefore, that this invention is not limited to the particular embodiment disclosed, but it is intended to cover modifications within the spirit and scope of the present invention as defined by the appended claims.

What is claimed is:

1. A communications apparatus for communicating electrical signals through an electrical line having a characteristic impedance comprising:
    modulator means for modulating the electrical signals to produce a modulated carrier signal having a first preselected frequency;
    transmitter means having an output impedance, electrically connected to said modulator means for transmitting the modulated carrier signal; and
    first coupler means connected between the electrical line and the transmitter means for matching the output impedance of said transmitter means to the characteristic impedance of the electrical line and for communicating the modulated carrier signal to the electrical line without substantial phase distortion; and
    said first coupler including a transformer having a non-magnetic core.

2. The communications apparatus in accordance with claim 1 wherein said transformer is an air core transformer.

3. A communications apparatus for communicating electrical signals through an electrical line having a characteristic impedance comprising:
    modulator means for modulating the electrical signals to produce a modulated carrier signal having a first preselected frequency;
    transmitter means having an output impedance, electrically connected to said modulator means for transmitting the modulated carrier signal;
    first coupler means connected between the electrical line and the transmitter means for matching the output impedance of said transmitter means to the characteristic impedance of the electrical line, said first coupler means comprising linear phase means for communicating the modulated carrier signal to the electrical line without significant phase distortion and capacitor means for resonating with the linear phase means at the first preselected frequency;
    receiver means having an input impedance for receiving the modulated carrier signal;
    demodulator means electrically connected to said receiver means for demodulating said modulated carrier signal to produce a demodulated carrier signal having a second preselected frequency; and
    second coupler means connected between the electrical line and the receiver means for matching the input impedance of said receiver means to the characteristic impedance of the electrical line, said second coupler means comprising linear phase means for communicating the modulated carrier signal to the receiver means without significant phase distortion and capacitor means for resonating with the linear phase means at the second preselected frequency; and
    said linear phase means of said first and second coupler means comprising an air-core transformer.

4. A communications apparatus for coupling electric signals to an electric line having a characteristic impedance comprising:
    a modulator adapted to modulate electric signals to produce a modulated carrier signal at a first frequency;
    a transmitter having an output impedance electrically connected to said modulator for transmitting the modulated carrier signal;
    a coupler adapted for connection between the electric line and the transmitter for matching the output impedance of said transmitter to the characteristic impedance of the electric line and for coupling the modulated carrier signal to the electric line without substantial phase distortion;
    said coupler including a transformer having a non-magnetic core.

5. The communications apparatus in accordance with claim 4 wherein said transformer is an air core transformer.

6. The communications apparatus in accordance with claim 4 wherein said electric line is a telephone line.

7. The communications apparatus in accordance with claim 4 wherein said electric line is a DC power line.

8. The communications apparatus in accordance with claim 4 wherein said electric line is an AC power line.

9. The communications apparatus in accordance with claim 4 wherein said electric line is a co-axial line.

10. The communications apparatus in accordance with claim 4 wherein said electric line is a DC electric line.

11. The communications apparatus in accordance with claim 4 wherein said electric line is an AC electric line.

12. The communications apparatus in accordance with claim 4 wherein said electric line is a twisted pair.

13. A communications apparatus for communicating electric signals through an electric line having a characteristic impedance, said apparatus including:
    a transmitter for transmitting a carrier signal, said transmitter being adapted to be electrically connected to the electric line; and
    a coupler for matching the output impedance of the transmitter to the characteristic impedance of the electrical line and coupling the carrier signal to the electric line without substantial phase distortion;
    said coupler coming a transformer having a non-magnetic core.

14. The communication apparatus of claim 13 wherein said coupler further comprises a capacitor connected in series with the primary of the non-magnetic transformer, said capacitor being configured to resonate with the transformer primary at the carrier signal frequency.

15. The communications apparatus in accordance with claim 14 wherein a resistor is connected in parallel with the capacitor.

16. A communication apparatus for communicating electrical signals through an electric line having a characteristic impedance, the apparatus comprising:

modulator means for modulating the electrical signals to produce a modulated carrier signal having a preselected frequency;

transmitter means having an output impedance connected to the modulator means for transmitting the modulated carrier signal; and transmitter coupler means adapted to be connected between the electric line and the transmitter means for matching the output impedance of the transmitter means to the characteristic impedance of the electric line, the coupler means comprising linear phase means for communicating the modulated carrier signal to the electric line without substantial phase distortion and capacitor means for resonating with the linear phase means at the preselected frequency;

said linear phase means comprising an non-magnetic air core transformer means comprising a primary coil having a first diameter, and a secondary coil having a second smaller diameter, the secondary coil extending coaxially within the primary coil such that an air gap is created between the primary and the secondary coils.

17. A communications apparatus for coupling electrical signals to an electric line having a characteristic impedance comprising:

a modulator adapted to modulate electrical signals to produce a modulated carrier signal at a first frequency;

a transmitter having an output impedance electrically connected to said modulator for transmitting the modulated carrier signal;

a coupler adapted for connection between the electric line and the transmitter for matching the output impedance of said transmitter to the characteristic impedance of the electric line and coupling the modulated carrier signal to the electric line without substantial phase distortion;

said coupler including a transformer having a non-magnetic core;

said transformer including a primary coil having a first diameter; and a secondary coil having a diameter smaller than the diameter of the primary coil, said secondary coil being positioned coaxially within said primary coil such that a non-magnetic gap is created between said primary and said secondary coils; and a capacitor for electrical connection between said primary coil and the electric line, wherein said primary coil and said capacitor are matched to the characteristic impedance of the electric line at a preselected frequency bandwidth.

18. A communications apparatus for coupling electric signals to an electric line having a characteristic impedance comprising:

a modulator adapted to modulate electric signals to produce a modulated carrier signal;

a transmitter for transmitting the modulated carrier signal;

a coupler adapted for connection between the electric line and the transmitter, said coupler comprising a transformer with a non-magnetic core, the primary of said transformer being connected in series with a capacitor network, said capacitor network being configured to resonate with the transformer primary at the transmitter's carrier signal frequency so the coupler provides a resistive impedance matched to the characteristic impedance of the electric line.

19. The communications apparatus of claim 18 wherein the capacitor network includes at least one capacitor connected in parallel with a resistor.

20. A communication apparatus for coupling electric signals through an electric line having characteristic impedance comprising:

a modulator adapted to modulate electric signals to produce a modulated carrier signal;

a transmitter for transmitting a modulated carrier signal;

a coupler adapted for connection between the electric line and the transmitter, said coupler comprising a transformer with a non-magnetic core, the primary of said transformer being connected in series with a capacitor network, said capacitor network being configured to resonate with the transformer primary at the transmitter's carrier signal frequency;

whereby any impedance change in the primary winding of the transformer does not reflect to the secondary winding of the transformer and any impedance change in the secondary winding of the transformer does not reflect to the primary transformer.

21. A communications apparatus for coupling electric signals to an electric line having a characteristic impedance comprising:

a modulator adapted to modulate electric signals to produce a modulated carrier a signal at a carrier signal frequency;

a transmitter having an output impedance electrically connected to said modulator for transmitting the modulated carrier signal;

coupler means adapted for connection between the electric line and the transmitter for matching the output impedance of said transmitter to the characteristic impedance of the electric line and for coupling the modulated carrier signal to the electric line without substantial phase distortion;

said coupler means including a capacitive transformer comprising a primary coil having a first diameter, and a secondary coil having a second diameter, the primary coil and secondary coil being coaxial with each other and spaced apart such that there is a dielectric gap and static capacitance between the primary and secondary coils whereby the coils are both capacitively and inductively coupled to each other; and a capacitor connected to the primary coil, said primary coil and capacitor being impedance matched to the characteristic frequency of the electric line at the carrier frequency.

22. A communications apparatus for coupling electric signals to an electric line having a characteristic impedance comprising:

a modulator adapted to modulate electric signals to produce a modulated carrier signal at a carrier signal frequency;

a transmitter having an output impedance electrically connected to said modulator for transmitting the modulated carrier signal;

a coupler adapted for connection between the electric line and the transmitter for matching the output impedance of said transmitter to the characteristic impedance of the electric line and coupling the modulated carrier signal to the electric line without substantial phase distortion;

said coupler including a capacitive transformer having a dielectric core;

said transformer including a primary coil having a first diameter and a secondary coil having a second diameter different from the diameter of the primary coil, said secondary coil being positioned coaxially with said primary coil such that there is a dielectric gap and static capacitance between the primary and secondary coils whereby the coils are both capacitively and inductively coupled to each other; and a capacitor for electrical connection between the primary coil and the electric line, the primary coil and the capacitor being impedance matched to the characteristic impedance of the electric line.

23. A communications apparatus for coupling electric signals to an electric line having a characteristic impedance comprising:

a modulator adapted to modulate electric signals to produce a modulated carrier signal at a carrier signal frequency;

a transmitter having an output impedance electrically connected to said modulator for transmitting the modulated carrier signal;

a coupler adapted for connection between the electric line and the transmitter for matching the output impedance of said transmitter to the characteristic impedance of the electric line and coupling the modulated carrier signal to the electric line without substantial phase distortion;

said coupler including a transformer exhibiting both inductive and capacitive coupling between its primary winding and secondary winding, said primary winding being separated from said secondary winding by a dielectric core;

a capacitor connected to the primary winding for impedance matching of the coupler to the electric line at the characteristic impedance of the electric line, and said secondary winding being impedance matched to the output impedance of the transmitter.

* * * * *